(12) United States Patent
Hung

(10) Patent No.: US 11,048,345 B2
(45) Date of Patent: Jun. 29, 2021

(54) IMAGE PROCESSING DEVICE AND IMAGE PROCESSING METHOD

(71) Applicant: Wacom Co., Ltd., Saitama (JP)

(72) Inventor: Ipei Hung, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 4 days.

(21) Appl. No.: 15/842,138

(22) Filed: Dec. 14, 2017

(65) Prior Publication Data

US 2018/0181220 A1    Jun. 28, 2018

(30) Foreign Application Priority Data

Dec. 27, 2016 (JP) ............................. JP2016-252249
Aug. 21, 2017 (JP) ............................. JP2017-158470

(51) Int. Cl.
| | | |
|---|---|---|
| *G06F 3/0354* | (2013.01) | |
| *G06F 3/03* | (2006.01) | |
| *G06F 3/038* | (2013.01) | |
| *G06F 3/0484* | (2013.01) | |
| *G05B 19/409* | (2006.01) | |
| *G06F 3/00* | (2006.01) | |
| *G06T 3/40* | (2006.01) | |

(Continued)

(52) U.S. Cl.
CPC ....... *G06F 3/03545* (2013.01); *G05B 19/409* (2013.01); *G06F 3/005* (2013.01); *G06F 3/0304* (2013.01); *G06F 3/038* (2013.01); *G06F 3/0321* (2013.01); *G06F 3/0383* (2013.01); *G06F 3/04845* (2013.01); *G06T 3/20* (2013.01); *G06T 3/40* (2013.01); *G06T 11/60* (2013.01)

(58) Field of Classification Search
CPC ..... G06F 3/03545; G06F 3/0321; G06T 3/20; G06T 3/40
See application file for complete search history.

(56) References Cited

U.S. PATENT DOCUMENTS

| | | | |
|---|---|---|---|
| 9,077,885 B2 | 7/2015 | Isozu et al. | |
| 2006/0013484 A1* | 1/2006 | Kono | ............... G06K 9/033 382/181 |
| 2011/0310123 A1 | 12/2011 | Matsubara | |

(Continued)

FOREIGN PATENT DOCUMENTS

| | | |
|---|---|---|
| CN | 102073454 A | 5/2011 |
| CN | 102298489 A | 12/2011 |
| JP | 2013-122647 A | 6/2013 |

OTHER PUBLICATIONS

Chinese Office Action, dated Mar. 30, 2021, for Chinese Application No. 201711431672.8, 34 pages. (with English Translation).

*Primary Examiner* — Alexander Eisen
*Assistant Examiner* — Kebede T Teshome
(74) *Attorney, Agent, or Firm* — Seed IP Group LLP

(57) ABSTRACT

An image processing device includes a processor; and a memory coupled to the processor, the memory storing a program that, when executed by the processor, causes the image processing device to: obtain first coordinate data indicating a coordinate position indicated by a position indicator from a sensor that detects the coordinate position; obtain first image data to which predetermined additional information is added; and associate the first image data with position data indicating a position on a display screen of a display device, the position corresponding to the first coordinate data.

20 Claims, 29 Drawing Sheets

(51) Int. Cl.
*G06T 3/20* (2006.01)
*G06T 11/60* (2006.01)

(56) References Cited

U.S. PATENT DOCUMENTS

| | | | |
|---|---|---|---|
| 2012/0114244 A1* | 5/2012 | Fujiwara | G06T 11/60 |
| | | | 382/186 |
| 2013/0328819 A1* | 12/2013 | Miyano | G06F 3/04883 |
| | | | 345/173 |
| 2016/0077784 A1* | 3/2016 | Yamada | G06F 3/03545 |
| | | | 345/2.3 |
| 2019/0035094 A1* | 1/2019 | Ishikawa | G06T 7/337 |

* cited by examiner

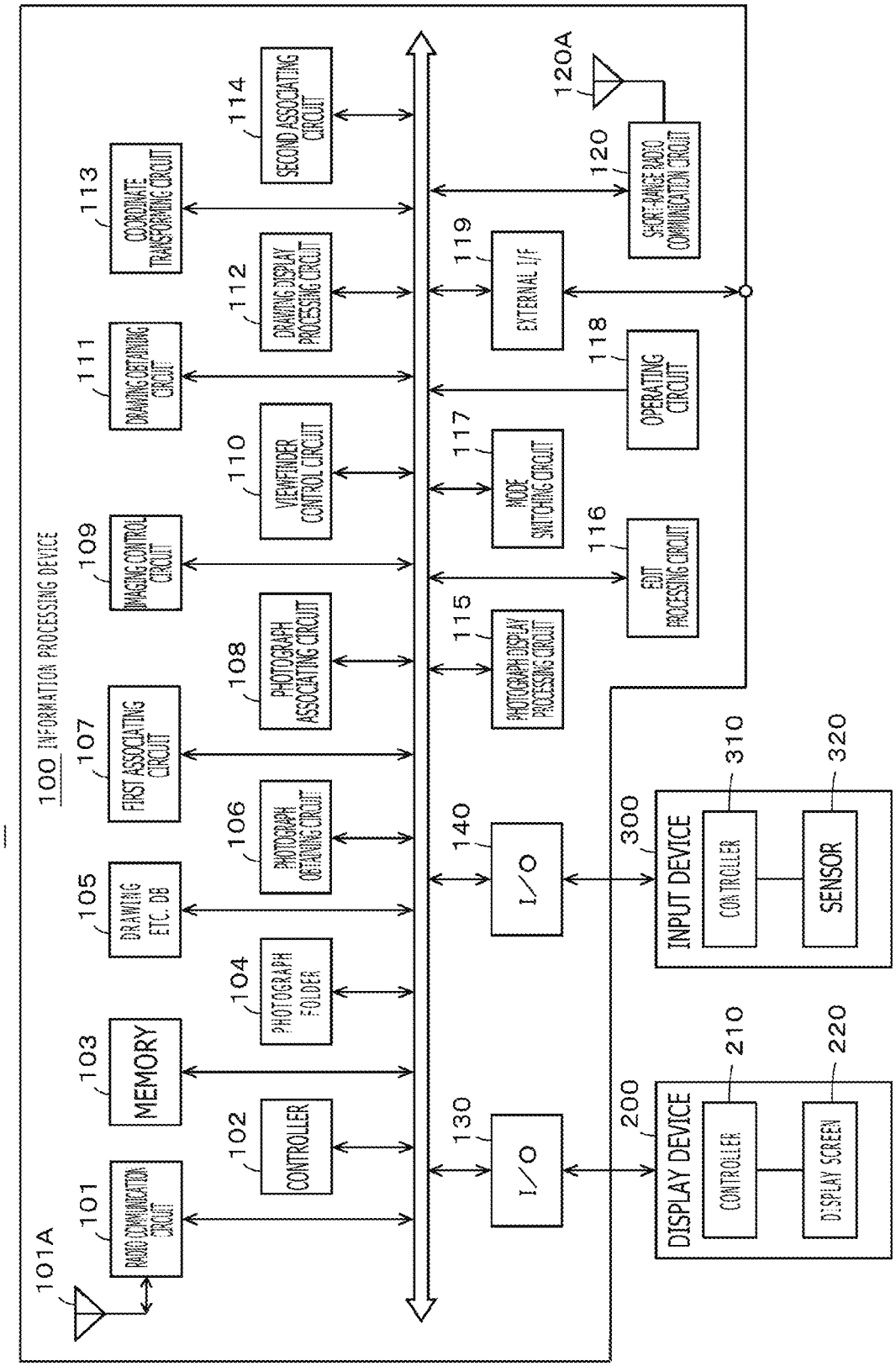

FIG.3A

| FACILITY ID | 001 : □□ CHEMICAL PLANT | | |
|---|---|---|---|
| TYPE | 01 : GENERAL DRAWING | | |
| FLOOR | | | |
| AREA ID | | | |
| BRANCH NUMBER | | | |
| DRAWING DATA | | | |

FIG.3B

| FACILITY ID | 001 : □□ CHEMICAL PLANT | | |
|---|---|---|---|
| TYPE | 02 : AREA DESIGN DRAWING | | |
| FLOOR | 01 : FIRST FLOOR | | |
| AREA ID | A01 : CONTROL ROOM | BASE STATION ID | aaa··· |
| BRANCH NUMBER | 01 : FRONT | | |
| DRAWING DATA | | | |

| PHOTOGRAPH ID | 0001.JPG |
|---|---|
| ADDITIONAL INFORMATION | PHOTOGRAPHING DATE AND TIME, PHOTOGRAPHING LOCATION, PEN ID, AND THE LIKE |
| PHOTOGRAPH DATA | |
| HANDWRITTEN NOTE DATA (HANDWRITING DATA) | |

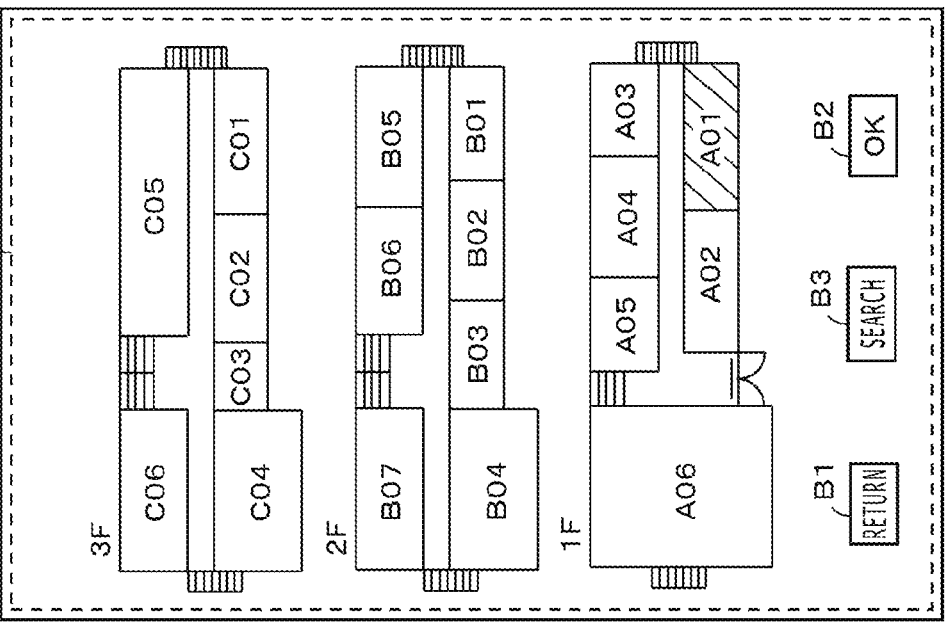

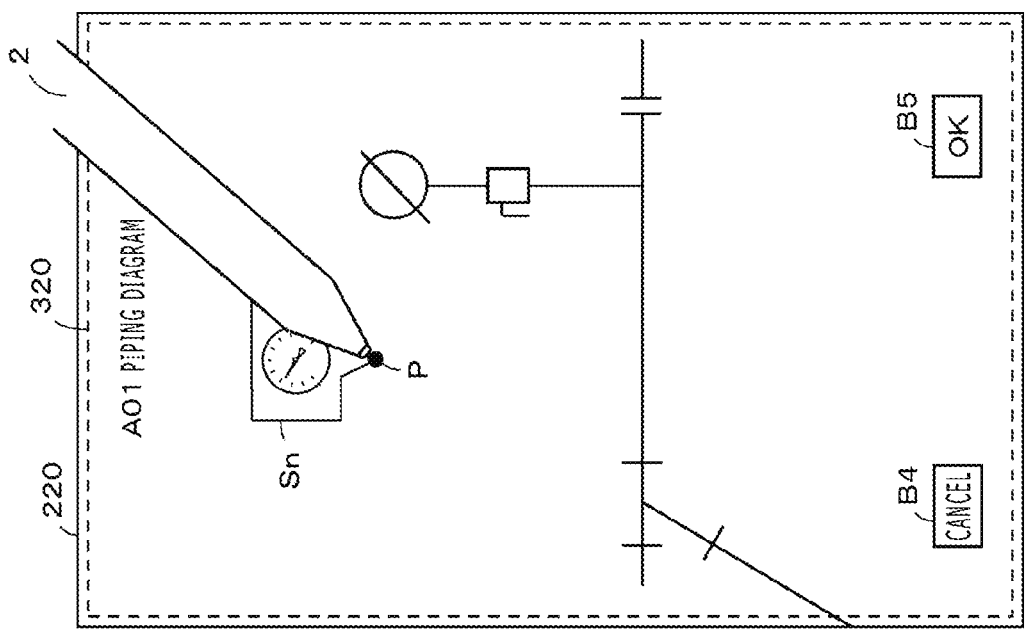
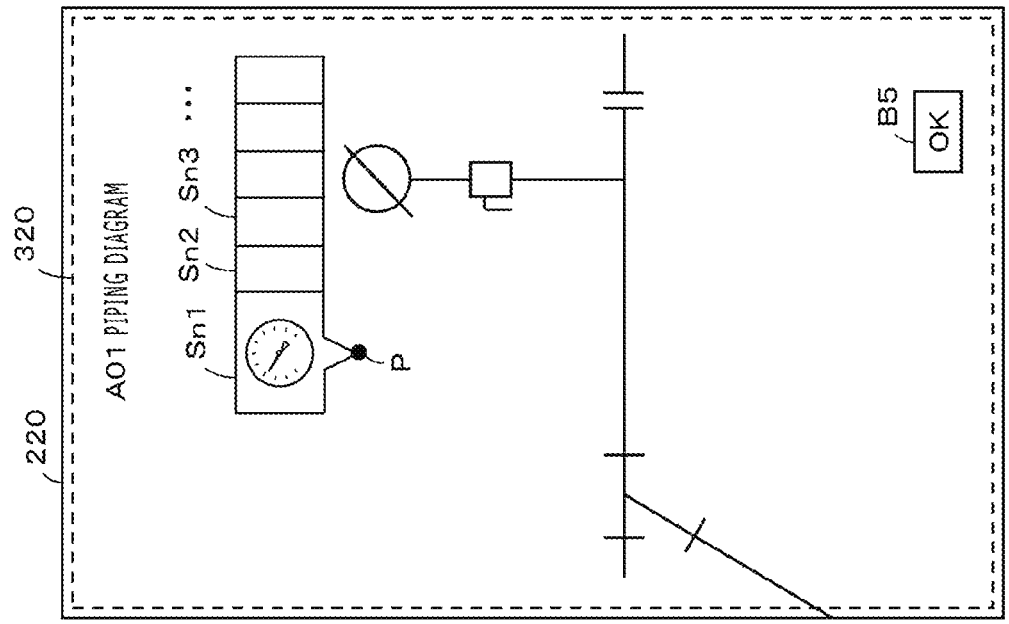

FIG.16

| FACILITY ID | 001 : □□ CHEMICAL PLANT | | |
|---|---|---|---|
| TYPE | 02 : AREA DESIGN DRAWING | | |
| FLOOR | 01 : FIRST FLOOR | | |
| AREA ID | A01 : CONTROL ROOM | | |
| BRANCH NUMBER | 02 : PIPING DIAGRAM | | |
| PHOTOGRAPH INFORMATION | | | |
| PHOTOGRAPH ID | 0001.Jpg | PASTED POSITION | X1, Y1 |
| PHOTOGRAPH ID | 0002.Jpg | PASTED POSITION | X2, Y2 |
| ⋮ | | | |

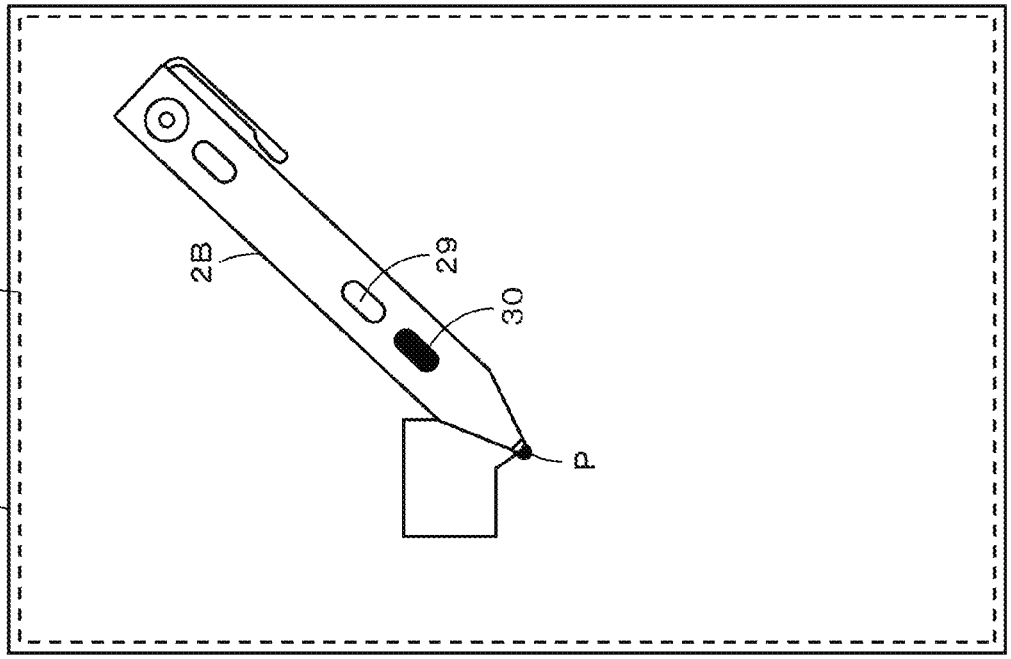
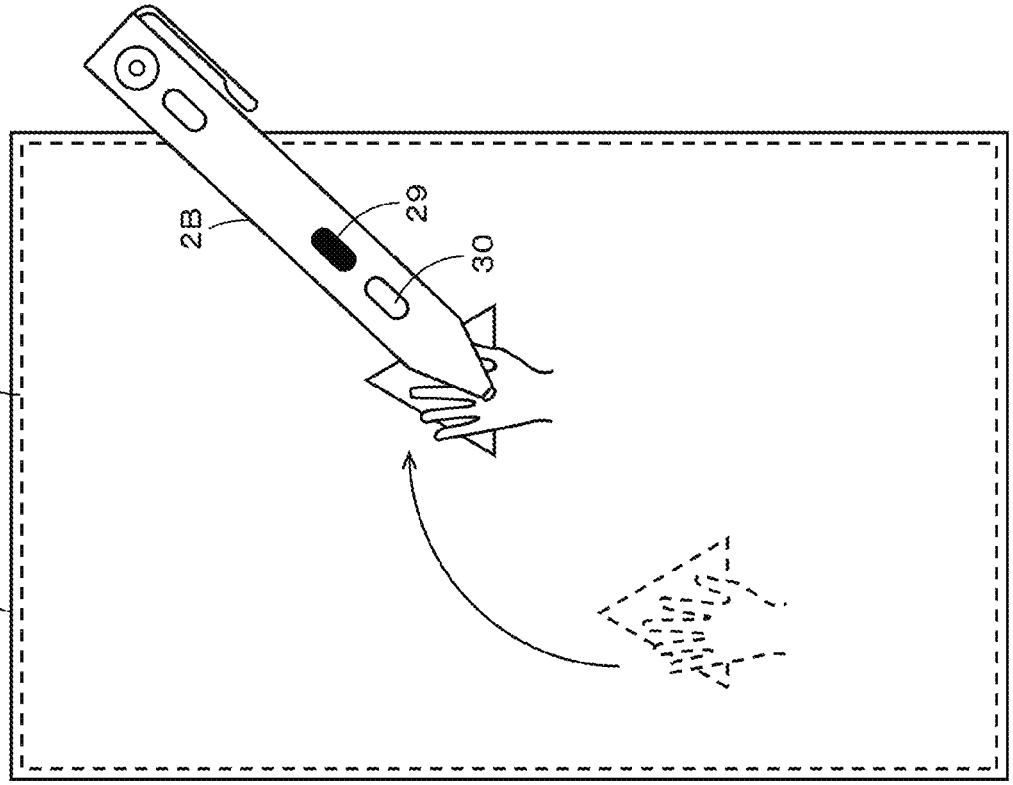

| STEREOSCOPIC IMAGE ID | 10001 : CIRCULAR CYLINDER |
|---|---|
| BRANCH NUMBER | 01 |
| REMARKS | BASIC THREE-DIMENSIONAL IMAGE |
| 3D OBJECT DATA | |

| 3D SPACE ID | 00001 : INTERIOR A |
|---|---|
| REMARKS | THREE-DIMENSIONAL SPACE IMAGE PATTERN OF INTERIOR |
| 3D SPACE IMAGE DATA | |

| SUBJECT ID | 20001 |
|---|---|
| ADDITIONAL INFORMATION | PHOTOGRAPHING DATE AND TIME, PHOTOGRAPHING LOCATION, PEN ID, AND THE LIKE |
| 3D OBJECT DATA OF SUBJECT | |
| HANDWRITTEN NOTE DATA (HANDWRITING DATA) | |

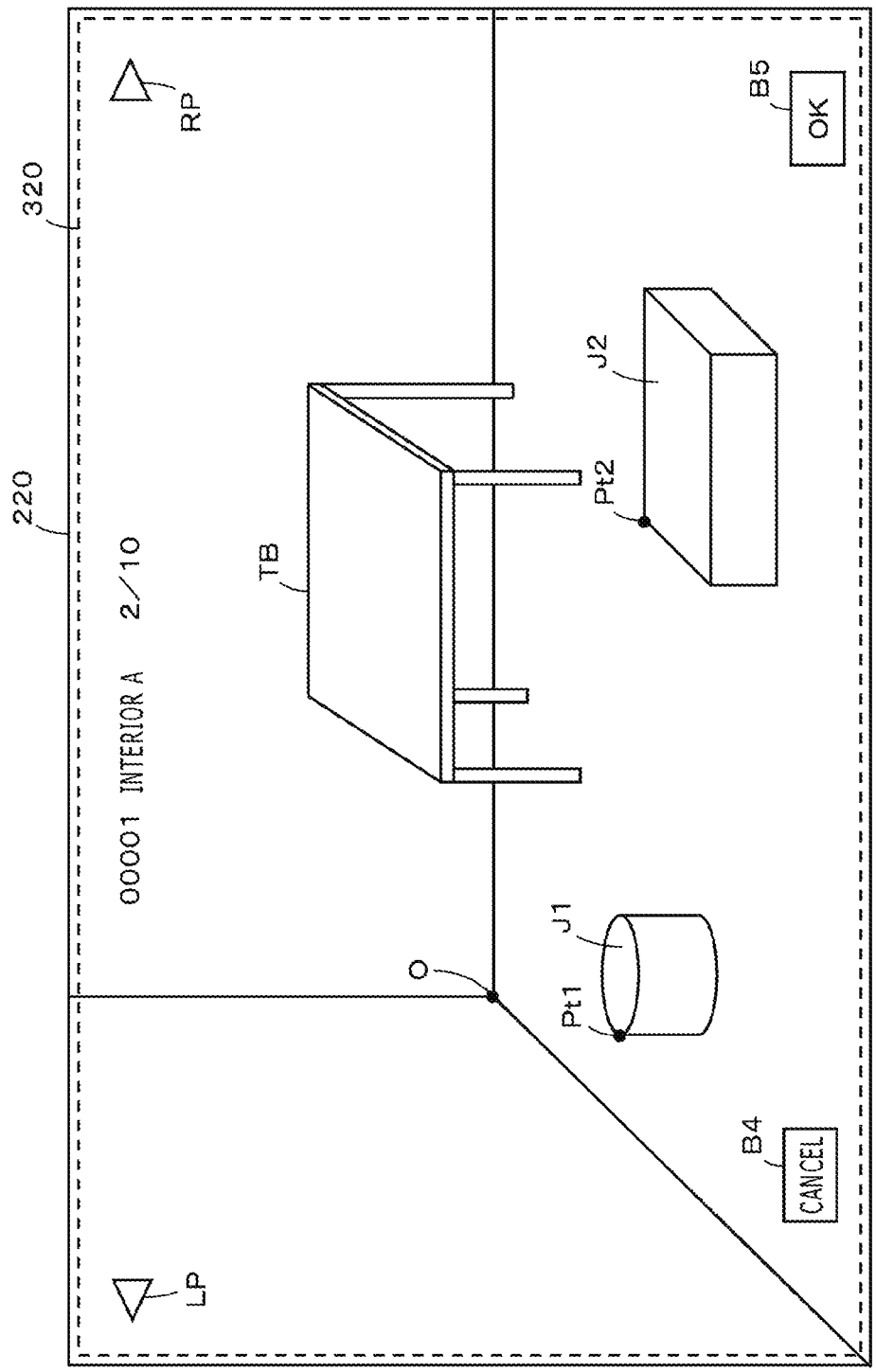

IMAGE PROCESSING DEVICE AND IMAGE PROCESSING METHOD

BACKGROUND

Technical Field

The present disclosure relates to a device and a method that make it possible to easily use, for example, image data formed by photographing a subject by a camera or the like.

Description of the Related Art

A present position (imaging position) obtained by a GPS (Global Positioning System) function incorporated in an imaging device such as a digital camera or the like at a time of imaging is added to image data obtained by imaging a subject by the imaging device, and the present position (imaging position) is used. Japanese Patent Laid-Open No. 2013-122647 (hereinafter, referred to as Patent Document 1) described in the following, for example, discloses a disclosure relating to an information processing device or the like that can readily display a map on which taken photographs are arranged according to photographing positions of the photographs.

Patent Document 1 discloses that a map and photographs are associated with each other using latitudes and longitudes as the imaging positions of the photographs, and the map and the photographs associated with each other are used. However, the photographs obtained by photographing cannot be used in association with coordinate positions specified by a user.

BRIEF SUMMARY

In view of the above, it is an object of the present disclosure to be able to quickly associate image data such as an appropriate photograph or the like with a coordinate position specified by a user and use the image data and the coordinate position associated with each other.

In order to solve the above-described problem, according to a first aspect of the disclosure, there is provided an image processing device including a processor; and a memory coupled to the processor, the memory storing a program that, when executed by the processor, causes the image processing device to: obtain first coordinate data indicating a coordinate position indicated by a position indicator from a sensor that detects the coordinate position; obtain first image data to which predetermined additional information is added; and associate the first image data with position data indicating a position on a display screen of a display device, the position corresponding to the first coordinate data.

According to the image processing device in accordance with the first aspect, the sensor can detect a coordinate position indicated by a position indicator. The image processing device obtains first coordinate data indicating the coordinate position detected from the sensor. The image processing device obtains first image data to which predetermined additional information is added. That is, the first image data to which the predetermined additional information is added is recognized as image data as an object for association with the position indicated by the position indicator, and is authenticated as image data that can be used for association.

The image processing device associates position data indicating a position on the display screen of the display device, the position corresponding to the first coordinate data, with the first image data, and makes usable the position data and the first image data associated with each other. For example, it becomes possible to provide the associated position data and second image data to the display device, and display an image corresponding to the first image data at the position on the display screen which position is identified by the position data.

According to the present disclosure, image data associated with a position indicated by a position indicator can be obtained and displayed. It is thereby possible to quickly obtain and use an image at a coordinate position specified by a user.

BRIEF DESCRIPTION OF THE DRAWINGS

FIG. 2 is a block diagram of assistance in explaining an example configuration of the tablet type information terminal according to an embodiment of the present disclosure;

FIGS. 3A and 3B are diagrams of assistance in explaining an example of stored data stored in a drawing etc. DB (database);

FIG. 4 is a diagram of assistance in explaining an example of stored data stored in a photograph folder;

FIGS. 11A and 11B are diagrams of assistance in explaining display examples of a display screen during inspection processing;

FIGS. 13A and 13B are diagrams of assistance in explaining display examples of the display screen during the inspection processing;

FIG. 16 is a diagram of assistance in explaining an example of associated data formed by a second associating;

FIGS. 20A and 20B are diagrams of assistance in explaining examples of methods of using side switches of the electronic pen;

FIG. 31 is a diagram of assistance in explaining association of 3D space image data and 3D object data of the subject with each other.

DETAILED DESCRIPTION

Figure 1:
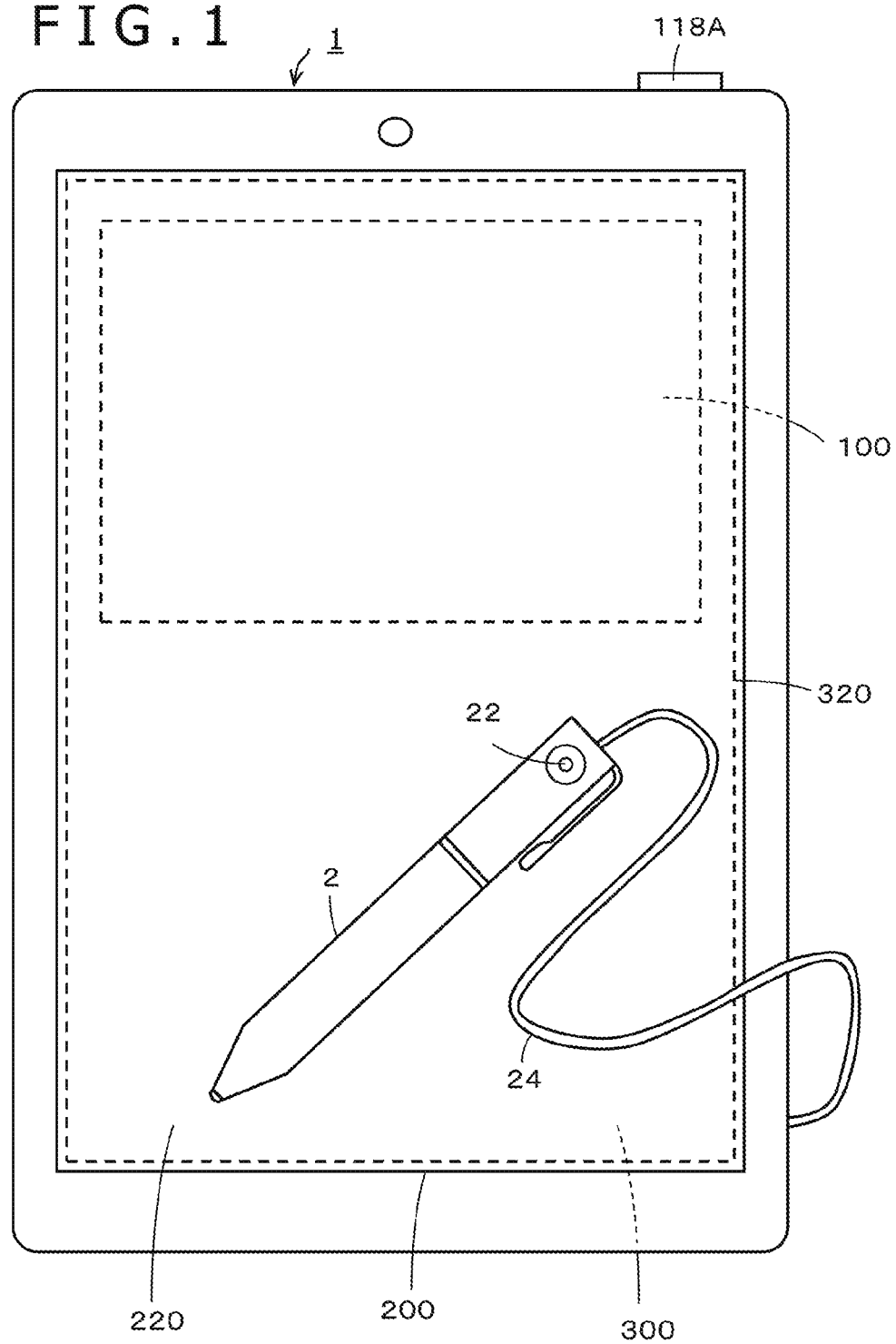
FIG. 1 is a diagram depicting an example of an external appearance of a tablet type information terminal and an electronic pen according to an embodiment of the present disclosure.

Embodiments of a device and a method according to the present disclosure will hereinafter be described with reference to the drawings. The following description will be made by taking as an example a case where the present disclosure is applied to a tablet type information terminal in which an information processing device, a display, and an input device are formed integrally with each other.

First Embodiment

A tablet type information terminal according to a first embodiment to be described in the following associates an image with a coordinate position on a display screen of a display (for example, a window screen of an application or the like) which coordinate position corresponds to an indicated position indicated by a finger of a user or an electronic pen and detected by an input device. In this case, image data to which predetermined additional information (association image specific information) is added as information indicating the association object image is obtained as image data of the association object image, and the image corresponding to the obtained image data is associated.

It is thus possible to promptly obtain an appropriate image such as a photograph set as an association object or the like, associate the image with the coordinate position on the display screen which coordinate position is indicated by the electronic pen, and use the image and the coordinate position associated with each other. That is, the tablet type information terminal according to the first embodiment to be described in the following can obtain only a special image for association, associate the image with coordinate data corresponding to the position indicated by the electronic pen, and use the image and the coordinate data associated with each other.

Further, first additional information for authentication is added to a signal transmitted from the electronic pen to the input device or the like. It is also possible to obtain image data as association object image data and authenticated as image data associated with the electronic pen, on the basis of the first additional information and second additional information as the predetermined additional information (association image specific information) added to the image data of a photograph or the like. Then, the obtained image and the coordinate data corresponding to the position indicated by the electronic pen can be associated with each other and used.

The following description will be made centering on a case of using both the first additional information added to the signal transmitted from the electronic pen to the input device or the like and the second additional information as the predetermined additional information (association image specific information) added to the image data of a photograph as an association object or the like. That is, description will be made centering on a case of obtaining image data as association object image data and authenticated as image data associated with the electronic pen, associating the obtained image with the coordinate data corresponding to the position indicated by the electronic pen, and using the image and the coordinate data associated with each other.

FIG. 1 is a diagram depicting an example of an external appearance of a tablet type information terminal 1 and an electronic pen 2 according to the first embodiment. The tablet type information terminal 1 has a constitution in which a relatively large display screen 220 such, for example, as an LCD (Liquid Crystal Display) or the like of a display 200 is exposed from a front surface of the tablet type information terminal 1. An input device 300 having a sensor (coordinate sensor) 320 provided so as to correspond to the entire surface of the display screen 220 is included on the front surface or back surface of the display screen 220.

The input device 300 can therefore detect any position indicated by the electronic pen 2 as a position indicator on the display screen 220 of the display 200 when the electronic pen 2 indicates the position. The detected indicated position on the sensor 320 is associated with the position on the display screen 220. In addition, the inside of a casing of the tablet type information terminal 1 includes an information processing device 100 to which the display 200 and the input device 300 are connected and which performs various kinds of information processing.

Thus, in the tablet type information terminal 1, the input device 300 serves as an input device, and the display 200 serves as a display device (output device). In addition, power to the tablet type information terminal 1 can be turned on/off by operating a power button 118A.

Then, suppose that a position indicating operation is performed by the electronic pen 2 on the display screen 220 in the tablet type information terminal 1. In this case, a position indication signal from the electronic pen 2 is transmitted to the sensor 320 of the input device 300. Then, on the basis of a detection output from the sensor 320 disposed so as to correspond to the entire surface of the display screen 220, a controller such as a CPU (Central Processing) or the like included in the input device 300 identifies an indicated position on the sensor 320, the indicated position on the sensor 320 being an indicated position on the display screen 220.

In addition, as will also be described later, in the present embodiment, the electronic pen 2 transmits a position indication signal including additional information (first additional information) such as an identifier (ID) (pen ID) identifying the electronic pen 2 itself or the like to the sensor 320. The controller included in the input device 300 can extract the first additional information from the position indication signal from the electronic pen 2 which position indication signal is received through the sensor 320. The controller of the input device 300 supplies the information processing device 100 with coordinate data indicating the identified indicated position and the extracted first additional information. The information processing device 100 can perform processing using the coordinate data and the first additional information from the input device 300.

Incidentally, the first additional information can also be transmitted to the information processing device 100 by, for example, short-range radio communication in accordance with the Bluetooth (registered trademark) standard or the like, instead of being included in the position indication signal transmitted from the electronic pen 2 to the input device 300. In this case, a transmission circuit that performs short-range radio communications needs to be provided on the electronic pen 2 side, and a reception circuit that performs short-range radio communications needs to be provided on the information processing device 100 side.

The information processing device 100 performs various kinds of processing according to indication inputs from a user which indication inputs are received through the input device 300. The information processing device 100, for example, displays a document such as a design drawing or the like on the display screen 220 according to an indication from the user. Then, the information processing device 100 can, for example, obtain the image data of a photograph or the like, and display an image corresponding to the obtained image data of the photograph or the like at a position indicated by the user on the displayed document such that the image is pasted at the position.

The electronic pen 2 transmits the position indication signal, which is a signal indicating a position on the sensor 320 of the input device 300 and includes the pen ID as the ID identifying the electronic pen 2 itself, and thus indicates the coordinate position on the sensor 320. The position indication signal includes the pen ID. Therefore, the pen ID is extracted in the input device 300, and is notified to the information processing device 100 to be usable in the information processing device 100. In the present embodiment, the pen ID included in the position indication signal transmitted from the electronic pen 2 is used as the first additional information.

In addition, the electronic pen 2 according to the present embodiment includes a camera 22, and is wire-connected to the tablet type information terminal 1 through a cable 24. The electronic pen 2 can transmit image data obtained by imaging a subject through the camera 22 included in the electronic pen 2 itself to the tablet type information terminal 1 through the cable 24. In this case, the electronic pen 2 transmits, to the tablet type information terminal 1, not only the image data but also the pen ID as the identification information of the electronic pen 2 itself in a state of being added to the image data. Incidentally, the pen ID added to the image data from the electronic pen 2 is used as the second additional information, which is the predetermined additional information (association image specific information).

Accordingly, on the basis of the pen ID (first additional information) included in the position indication signal from the electronic pen 2 and the pen ID (second additional information) added to the image data imaged by the electronic pen 2, the tablet type information terminal 1 associates the electronic pen 2 and the image data with each other. In the present example, the first additional information and the second additional information are both the pen ID of the electronic pen 2. This section that the image data to which the pen ID of the electronic pen 2 is added is association object image data, and is authenticated image data associated with the electronic pen 2.

FIG. 2 is a block diagram of assistance in explaining an example of a configuration of the tablet type information terminal 1 according to the present embodiment. The tablet type information terminal 1 is formed by connecting the display 200 to the information processing device 100 via an I/O (input/output) port 130, and connecting the input device 300 to the information processing device 100 via an I/O port 140.

The information processing device 100 controls the whole of the tablet type information terminal 1, and includes various circuits, which may be implemented by a controller as functional units, as will be described in the following. A transmitting and receiving antenna 101A and a radio communicating circuit 101 implement a function of connecting to a network. The network is mainly the Internet, but includes various networks such as a mobile telephone network, a public telephone network, or the like that establishes connection from the information processing device 100 to the Internet.

Though not depicted, a controller 102 includes a CPU (Central Processing Unit), a ROM (Read Only Memory), and a RAM (Random Access Memory). The controller 102 executes various programs to control each of the information processing device 100 as well as the display 200 and the input device 300 connected to the information processing device 100.

A memory 103 includes a nonvolatile memory such as an EEPROM (Electrically Erasable Programmable Read-Only Memory), a flash memory, or the like. The memory 103 stores and retains information that needs to be retained even after power to the tablet type information terminal 1 is turned off, the information being, for example, setting data, application programs, and the like.

A photograph folder 104 stores and retains mainly image data that is obtained by imaging a subject through the camera 22 of the electronic pen 2 and to which the pen ID is added. Incidentally, in the following, the image data obtained by imaging a subject through the camera 22 will be described as photograph data. The photograph data is first image data, and additional information such as the pen ID or the like added to the photograph data is second additional information.

In addition, a drawing etc. DB (DataBase) 105 stores and retains the image data of various drawings used in the tablet type information terminal 1. Incidentally, in the following, the image data of the drawings used in the tablet type information terminal 1 will be described as drawing data. As will be described later, this drawing data is second image data as an object of association with a photograph corresponding to photograph data.

FIGS. 3A and 3B are diagrams of assistance in explaining an example of drawing files as stored data stored in the drawing etc. DB 105. In addition, FIG. 4 is a diagram of assistance in explaining an example of a photograph file as stored data stored in the photograph folder 104. The data stored in the drawing etc. DB 105 will first be described with reference to FIGS. 3A and 3B. The drawing etc. DB 105 of the tablet type information terminal 1 according to the present embodiment stores and retains drawing data forming design drawings of facilities in which inspection is performed using the tablet type information terminal 1. As will be described later, the design drawings include: a general drawing (FIG. 3A) of the facilities, which general drawing can be used to identify inspection points of the facilities to be inspected; and a plurality of area design drawings (FIG. 3B) of the respective inspection points.

As depicted in FIGS. 3A and 3B, a drawing file as data stored in the drawing etc. DB 105 is obtained by adding metadata such as a facility ID and a facility name, a type, a floor, an area ID, a branch number, and the like to the drawing data forming the design drawing. Incidentally, as will be described later in detail, a base station ID is added to the area design drawing depicted in FIG. 3B.

In the present embodiment, the facility ID is a three-digit number. The facility name is a specific name of the facilities. The facility name in FIGS. 3A and 3B is "□□ chemical plant." The type indicates what kind of drawing the corresponding design drawing is, and, for example, indicates a general drawing or an area design drawing.

The floor (story) is information indicating the floor of a location to which the design drawing corresponds. The area ID is information that can uniquely identify the location (area) to which the design drawing corresponds. The base station ID is information used when a beacon signal from a base station installed in each inspection target area is received, the inspection target area is automatically identified on the basis of the base station ID included in the beacon signal, and the corresponding area design drawing is identified.

The branch number is a number for, in a case where there are a plurality of design drawings corresponding to the location (area) identified by the area ID, distinguishing the design drawings from each other. For example, in a case where there are a plurality of area design drawings or the like for a location (area) indicated by an area ID of "A01," branch numbers are expressed as "01," "02," "03," . . . . Hence, an area design drawing of each area can be uniquely identified by an "area ID" and a "branch number."

Incidentally, in the present embodiment, description will be made supposing that a beacon signal from a base station installed in each inspection target area is received and a base station ID is used to identify an inspection target area and an area design drawing. However, there is no limitation to this. For example, an inspection target area may be identified by reading a quick response (QR) code (registered trademark), a bar code, or the like posted in the vicinity of an entrance of the inspection target area through an imaging, not depicted, of the tablet type information terminal 1. In this case, the base station ID depicted in FIG. 3B is information corresponding to the QR code (registered trademark) or the bar code.

Alternatively, an infrared signal transmitter is installed in each inspection target area, and the tablet type information terminal 1 is provided with an infrared communicating function. It is thereby possible to transmit and receive information identifying an inspection target area by infrared communication, and identify the inspection target area and an area design drawing. In addition, in a case where a present position can be determined accurately by a global positioning system (GPS) function even indoors, it is possible to identify an inspection target area on the basis of the present position determined by the GPS function and the general drawing, and identify an area design drawing of the inspection target area.

As depicted in FIG. 3A, metadata, that is, a facility ID and a facility name "001: □□ chemical plant" and a type "01: general drawing" are added to the drawing file of the general drawing among the drawing files stored in the drawing etc. DB 105. A floor, an area ID, and a branch number as other information of the drawing file of the general drawing are blanks.

In addition, as depicted in FIG. 3B, the drawing data of an area design drawing or the like other than the general drawing in the drawing files stored in the drawing etc. DB 105 has a facility ID and a facility name identical to those of the general drawing. In addition, a type is, for example, "02: area design drawing," a base station ID is "aaa . . . ," a floor is, for example, "01: first floor," an area ID is, for example, "A01: control room," and a branch number is, for example, "01: front." Information corresponding to each drawing is thus added.

Thus, for each of the various drawings of the facilities to be inspected, the drawing etc. DB 105 stores and retains drawing files obtained by adding metadata to the drawing data forming the respective drawings. Incidentally, the drawing etc. DB 105 may store the drawing files of all of the drawings of the facilities to be inspected, or it is possible to store the drawing files of all of the drawings of the facilities to be inspected in a server device on the Internet in advance, and download and retain only the drawing file of a necessary drawing.

A photograph file as data stored in the photograph folder 104 will next be described with reference to FIG. 4. The photograph folder 104 of the tablet type information terminal 1 according to the present embodiment stores and retains, for example, photograph files that have photograph data obtained by imaging a subject through an external imaging device. Hence, the photograph folder 104 stores photograph files having photograph data obtained by imaging a subject through the camera 22 of the electronic pen 2 wire-connected to the tablet type information terminal 1 or the like. A photograph file stored in the photograph folder 104 is formed by adding a photograph ID, additional information, handwritten note data, and the like to photograph data, as depicted in FIG. 4.

The photograph ID is identification information for uniquely identifying the corresponding photograph data. In the present embodiment, the photograph ID is information added in the tablet type information terminal 1 when the tablet type information terminal 1 obtains the corresponding photograph data. The additional information is information added in the imaging device at a time of photographing, and includes, for example, an imaging date and time, a photographing location, a device ID such as the pen ID or the like, other information, and the like.

The imaging date and time is information indicating a date and time obtained from a clock circuit of the imaging device at a time of imaging. The imaging location is a latitude and a longitude obtained from a GPS of the imaging device at the time of the imaging. The pen ID is information added in a case of image data imaged by the camera 22 of the electronic pen 2, and is electronic pen identification information that can uniquely identify the electronic pen 2. Incidentally, in the present embodiment, description will be made supposing that, to simplify the description, only the pen ID is added as the additional information added to the image data imaged by the camera 22 of the electronic pen 2.

That is, all of the information such as the imaging date and time, the imaging location, the pen ID, and the like is not always added to the photograph data, but a device ID such as a camera ID, rather than the pen ID, can be added to photograph data imaged by a digital camera. In addition, these pieces of information are not added in a case of an imaging device not having a clock circuit nor a GPS function. Of course, various kinds of additional information compliant with the Exif (Exchangeable image file format) standard, for example, can also be added in addition to the imaging date and time, the photographing location, and the device ID such as the pen ID or the like.

A handwritten note (handwriting data) input by the user of the tablet type information terminal 1 can also be added to the photograph data. Thus, the photograph file stored and retained in the photograph folder 104 is formed by adding metadata constituted of the photograph ID and the additional information to the photograph data, and allows handwritten note data to be added to the photograph file as required.

As also described above, the photograph data of a photograph file stored and retained in the photograph folder 104 is first image data, and the drawing data of a drawing file stored and retained in the drawing etc. DB 105 is second image data. In addition, as will also be described later, the pen ID included in the position indication signal from the electronic pen 2 is first additional information, and the additional information added to the photograph data of a photograph file stored and retained in the photograph folder 104 is second additional information. The pen ID, in particular, is important as the second additional information.

Each processing of the information processing device 100 will next be described. A photograph obtaining circuit 106 performs processing of obtaining, from the photograph folder 104, photograph data associated with the electronic pen 2 performing position indication on the sensor 320 of the input device 300 to be described later. A first associating circuit 107 performs processing of associating the photograph data obtained by the photograph obtaining circuit 106 with a coordinate position (coordinate data) on the display screen 220 of the display 200, the coordinate position on the display screen 220 corresponding to a coordinate position on the sensor 320 of the input device 300 which coordinate position is indicated by the electronic pen 2.

As described above, the sensor 320 of the input device 300 and the display screen 220 of the display 200 are arranged so as to be superposed on each other, and a detection area of the sensor 320 and a display area of the display screen 220 coincide with each other. Therefore, the indicated position on the sensor 320 uniquely corresponds to a position on the display screen 220, and the position on the display screen 220 which position corresponds to the indicated position on the sensor 320 can be uniquely identified.

A photograph associating circuit 108 performs processing of associating (pasting) an image corresponding to the photograph data with (at) the coordinate position on the display screen 220 of the display 200 and displaying the image at the coordinate position, using the coordinate position and the photograph data associated with each other by the first associating circuit 107. An imaging control circuit 109 performs processing of controlling the camera 22 of the wire-connected electronic pen 2.

A viewfinder control circuit 110 performs processing of providing a display area on the display screen of the display 200 and displaying video (moving image) of a subject being captured by the camera 22 of the electronic pen 2 when the subject is imaged through the camera of the wire-connected electronic pen 2. This is because the electronic pen 2 has a size and a shape substantially identical to those of an ordinary fountain pen or an ordinary ballpoint pen and therefore the electronic pen 2 cannot be provided with a display functioning as a so-called viewfinder.

A drawing obtaining circuit 111 performs processing of obtaining drawing data forming the general drawing of the facilities to be inspected, an area design drawing of an inspection location, or the like from the drawing etc. DB 105 according to an instruction from the user of the tablet type information terminal 1 or according to a position at which the tablet type information terminal 1 is located. A drawing display processing circuit 112 performs processing of displaying a drawing corresponding to the drawing data obtained by the drawing obtaining circuit 111 on the display screen 220 of the display 200, and, for example, enlarging/reducing the displayed drawing or shifting (moving) a display part according to an instruction from the user.

A coordinate transforming circuit 113 performs processing of transforming the coordinate position on the sensor 320 of the input device 300 which position is indicated by the electronic pen 2 into a coordinate position on the drawing displayed on the display screen of the display 200. A second associating circuit 114 performs processing of associating the drawing data as second image data, the coordinate position on the drawing which coordinate position is transformed by the coordinate transforming circuit 113, and the photograph data as first image data with one another.

Here, the drawing data forms the design drawing displayed on the display screen of the display 200 by the drawing display processing circuit 112. The coordinate position on the drawing is a coordinate position on the drawing displayed on the display screen which coordinate position corresponds to the position indicated by the electronic pen 2 and is transformed by the coordinate transforming circuit 113. The photograph data as first image data is obtained by the photograph obtaining 106. Thus, the image corresponding to the photograph data can be associated with (pasted at) the target coordinate position on the target drawing.

A photograph display processing circuit 115 performs processing of displaying the image (photograph) corresponding to the photograph data obtained by the photograph obtaining circuit 106 on the display screen 220 of the display 200. An edit processing circuit 116 performs edit processing such as enlargement/reduction, movement, or the like of the image displayed on the display screen 220 of the display 200 by the photograph display processing circuit 115. A mode switching circuit 117 performs switching control of each processing mode such as a photograph association mode in which an indicating operation on the sensor 320 of the input device 300 by the electronic pen 2 is an operation of indicating an associated position of the taken photograph or the like, a photograph edit mode, a normal processing mode, and the like.

An operating circuit 118 is a part including the power button 118A and a few function keys. An external I/F (I/F is an abbreviation of Interface) 119 receives connection of an external apparatus, and enables transmission and reception of data to and from the external apparatus. A short-range radio communication circuit 120 and a short-range radio communication antenna 120A are a part enabling short-range communication by a wireless LAN (Local Area Network) compliant with the Wireless Fidelity (Wi-Fi) (registered trademark) standard, for example.

The I/O ports 130 and 140 are input-output ports conforming to a predetermined communication system such as I2C (Inter-Integrated Circuit), USB (Universal Serial Bus), or the like. The I/O port 130 enables transmission and reception of data between the information processing device 100 and the display 200. The I/O port 140 enables transmission and reception of data between the information processing device 100 and the input device 300.

The display 200 is constituted of a controller 210 and a thin display screen (display element) such, for example, as an LCD (Liquid Crystal Display), an organic EL (Organic Electro-Luminescence) display, or the like. The controller 210 is a microprocessor including a CPU and a nonvolatile memory.

The input device 300 is constituted of the controller 310 and the sensor 320. The controller 310 is a microprocessor including a CPU and a nonvolatile memory. The sensor 320 is a part formed by stacking conductive line group arranged in an X-axis direction (horizontal direction) and a conductive line group arranged in a Y-axis direction (vertical direction). The input device 300 receives a position indication signal from the electronic pen 2 by the sensor 320, and detects a position on the sensor 320 at which position the position indication signal is received, by using the controller 310. In addition, the controller 310 extracts additional information such as the pen ID or the like, information indicating a pen pressure, and the like, which are included in the position indication signal from the electronic pen 2, the position indication signal being received through the sensor 320.

Then, the controller 310 of the input device 300 supplies the information processing device 100 with coordinate data corresponding to the detected indicated position, the extracted additional information, and the extracted pen pressure information. As a configuration of the input device 300, there is an electromagnetic induction system, a capacitive system, or the like, and the electronic pen 2 is compatible with a system adopted by the input device 300.

Figure 5:
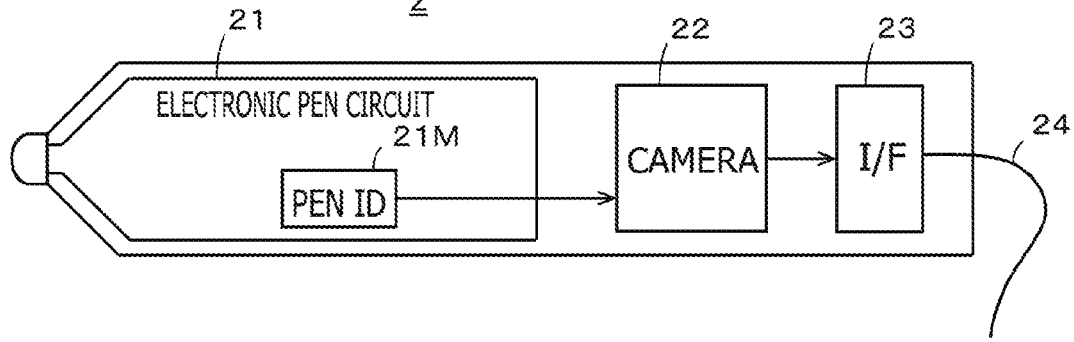
FIG. 5 is a block diagram of assistance in explaining an example configuration of the electronic pen according to the embodiment.

FIG. 5 is a block diagram of assistance in explaining an example configuration of the electronic pen 2 according to the present embodiment. As depicted in FIG. 5, the electronic pen 2 includes an electronic pen functional 21, a camera 22, and an I/F (Interface) 23. The electronic pen circuit 21 includes a memory 21M storing the pen ID. When a pen tip is brought into contact with a position on the sensor of the tablet type information terminal 1, the electronic pen circuit 21 detects a pen pressure, forms a position indication signal including the pen pressure and the pen ID, and transmits the position indication signal.

The camera 22 of the electronic pen 2 includes an imaging element such as a charge-coupled device (CCD), a complementary metal-oxide semiconductor (CMOS) image sensor, or the like, a frame memory, an objective lens, a controller, and the like. The camera 22 captures an image of a subject and supplies the image as moving image data to the tablet type information terminal 1, or captures an image of a subject as still image data and supplies the still image data to the tablet type information terminal 1 according to control of the tablet type information terminal 1. Incidentally, the pen ID stored and retained in the memory 21M is added to the still image data (photograph data) obtained by imaging the subject.

The I/F 23 enables transmission and reception of data to and from the tablet type information terminal 1. The I/F 23 can not only transmit the photograph data from the camera 22 to the tablet type information terminal 1 but also receive a control signal from the tablet type information terminal 1 and supply the control signal to the controller of the camera 22 so that the camera 22 is controlled through the tablet type information terminal 1.

Figure 6:
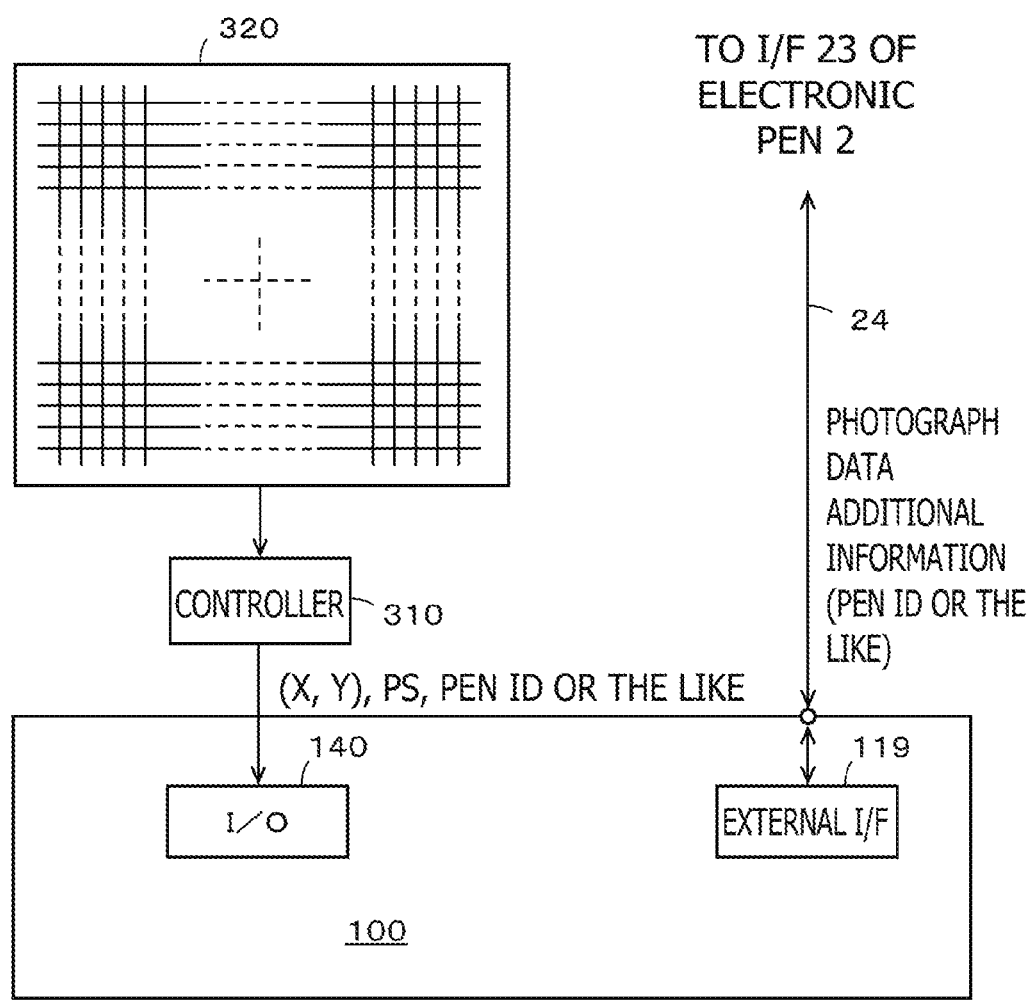
FIG. 6 is a diagram of assistance in explaining a connection relation between the tablet type information terminal and the electronic pen according to the embodiment.

FIG. 6 is a diagram of assistance in explaining a connection relation between the tablet type information terminal 1 and the electronic pen 2 in the present embodiment. As depicted in FIG. 6, the input device 300 is connected to the information processing device 100 through the I/O port 140. Therefore, when the electronic pen 2 is brought into contact with a position on the sensor 320 of the input device 300, a position indication signal from the electronic pen 2 is received by the sensor 320, and coordinate data (X, Y) indicating an indicated position is detected and a pen pressure PS and the pen ID are extracted through the controller 310. The coordinate data (X, Y), the pen pressure PS, and the pen ID are supplied to the information processing device 100.

In addition, the I/F 23 of the electronic pen 2 and the external I/F 119 of the information processing device 100 are connected to each other by the cable 24. Therefore, the photograph data of an image photographed through the camera 22 of the electronic pen 2 and the pen ID as additional information or the like are supplied to the information processing device 100 through the cable 24. In addition, a control signal giving an instruction to perform imaging to the electronic pen 2 or the like is supplied from the information processing device 100 to the camera 22 through the cable 24.

Thus, the tablet type information terminal 1 and the electronic pen 2 are connected to each other by a coordinate indication system in which coordinate indication input is performed through the input device 300. In addition, the tablet type information terminal 1 and the electronic pen 2 are connected to each other by a photograph input system in which the external I/F 119 and the I/F 23 are connected to each other through the cable 24 and mainly photograph data is input. The tablet type information terminal 1 and the electronic pen 2 are made connectable to each other by these two systems, and are able to transmit and receive different pieces of information by the respective systems.

Inspection work for predetermined facilities can be performed appropriately by using the tablet type information terminal 1 and the electronic pen 2 according to the present embodiment described with reference to FIGS. 1 to 6. In the inspection work, the tablet type information terminal 1 performs inspection processing (application for the inspection work). The inspection processing performed in the tablet type information terminal 1 according to the present embodiment will be described concretely in the following.

FIGS. 7 to 10 are flowcharts of assistance in explaining processing performed by the information processing device 100 of the tablet type information terminal 1. In addition, FIGS. 11 to 14 are diagrams of assistance in explaining display examples of images displayed on the display screen of the display 200 by the information processing device 100 when the inspection processing is performed.

When power to the tablet type information terminal 1 is turned on by operating the power button 118A of the operating circuit 118 of the tablet type information terminal 1, the controller 102 of the information processing device 100 performs processing depicted in FIGS. 7 to 10. First, the controller 102 performs processing of displaying, on the display screen of the display 200, an initial screen displaying a plurality of icons corresponding to processing (applications) that can be performed in the device (S101). Next, the controller 102 receives an operating input such as an icon selecting input or the like through the input device 300 or the operating circuit 118 (S102).

Then, at S102, the controller 102 determines whether or not an operating input that gives an instruction to end the processing is received (S103). When the controller 102 determines in the determination processing at S103 that a predetermined ending operation such as operation of the power button 118A or the like is performed, for example, the controller 102 performs predetermined ending processing such as turning off the power to the tablet type information terminal 1 (S104), and ends the processing depicted in FIGS. 7 to 10.

When the controller 102 determines in the determination processing at S103 that the predetermined ending operation is not performed, the controller 102 determines whether or not an icon for performing the inspection processing is selected (S105). When determining in the determination processing at S105 that the icon for performing the inspection processing is not selected, the controller 102 performs processing corresponding to an icon selected by the user (S106). After ending the processing, the controller 102 repeats the processing from S101.

Then, suppose that it is determined in the determination processing at S105 that the icon for performing the inspection processing is selected. In this case, first, the controller 102 displays, on the display screen of the display 200, an inspection facility selecting screen as a list of facilities in which inspection work can be performed using the tablet type information terminal 1, the list being registered in the memory 103 in advance (S107).

FIG. 11A is a diagram of assistance in explaining an example of the inspection facility selecting screen displayed at S107. The inspection facility selecting screen depicted in FIG. 11A displays a list of facility IDs and facility names of facilities in which inspection work can be performed using the tablet type information terminal 1. In the display of the list, a selecting cursor CS is positioned in a display section of a facility ID and a name at a top, and enables selection of facilities in which to perform inspection.

Specifically, when the pen tip of the electronic pen 2 is brought into contact with the display section of the facility ID and the facility name of target facilities, coordinate data corresponding to the indicated position is supplied from the input device 300 to the information processing device 100. The controller 102 can thereby position the selecting cursor CS at the display section of the facility ID and the facility name at the position indicated by the electronic pen 2 on the basis of the coordinate data from the input device 300. The user can thus position the selecting cursor CS at the display section of the facility ID and the facility name of the target facilities.

In addition, a "return" button B1 and an "OK" button B2 are displayed on a lower end 4 of the inspection facility selecting screen. Operating input to the "return" button B1 and the "OK" button B2 can be individually performed by the electronic pen 2. The controller 102 receives an operation of moving the selecting cursor CS or an operating input to the "return" button B1 or the "OK" button B2 through the input device 300. At S108, an operating input is sought until the "return" button B1 or the "OK" button B2 is operated.

Then, the controller 102 determines at S108 whether or not the "return" button is operated (S109). When determining in the determination processing at S109 that the "return" button B1 is operated, the controller 102 repeats the processing from S101. The user can thereby perform an operation so as to select and perform intended processing again.

When determining in the determination processing at S109 that the "return" button B1 is not operated, the controller 102 determines that the "OK" button B2 is operated, and identifies the facilities identified by the facility ID and the facility name at which the selecting cursor CS is positioned as inspection target facilities. In the present embodiment, suppose that, as depicted in FIG. 11A, the selecting cursor CS is positioned at the display section of a facility ID "001" and a facility name "□□ chemical plant" in an uppermost row, and that the "OK" button B2 is operated and selected.

In this case, the controller 102 performs processing of displaying a general drawing of "□□ chemical plant" having the facility ID "001" on the display screen 220 of the display 200 (S110). At S110, the controller 102 first controls the drawing obtaining circuit 111 to obtain the drawing data of the general drawing of the selected "□□ chemical plant" having the facility ID "001" from the drawing etc. DB 105. The controller 102 next controls the drawing display processing circuit 112 to display the general drawing corresponding to the drawing data obtained by the drawing obtaining circuit 111 on the display screen 220 of the display 200.

FIG. 11B is a diagram of assistance in explaining a display example of the general drawing of the facilities selected as the facilities to be inspected (inspection target facilities) and having the facility ID "001" and the name "□□ chemical plant," the general drawing being displayed at S110. The general drawing of the facilities which general drawing is depicted in FIG. 11B is an example depicted as a sketch of floors.

As depicted in FIG. 11B, the facilities having the facility ID "001" and the name "□□ chemical plant" are a three-story building in which a first floor has six areas, a second floor has seven areas, and a third floor has six areas. The controller 102 receives an operating input such as an inspection target area selecting input or the like through the display of the general drawing and operating buttons displayed on the display screen 220 of the display 200 and the input device 300 (S111).

The tablet type information terminal 1 according to the present embodiment allows an inspection target area to be selected by using one of two methods. A first method is a method of selecting an inspection target area by bringing the pen tip of the electronic pen 2 into contact with the display position of the area to be inspected in the general drawing of the inspection target facilities which general drawing is depicted in FIG. 11B. A second method is a method of receiving a predetermined beacon signal transmitted from a transmitter (base station) installed in advance in an area as an inspection target and selecting the inspection target area on the basis of a base station ID included in the beacon signal.

When the second method is performed, an operation of selecting a "search" button B3 depicted in FIG. 11B by the electronic pen 2 is performed. In addition, also on the display screen of the general drawing of the inspection target facilities depicted in FIG. 11B, a "return" button B1 and an "OK" button B2 are displayed, and are operable through the electronic pen 2. In the operating input reception processing at S111, operating input is sought until the "return" button B1 is operated or the "search" button B3 is operated or the "OK" button B2 is operated after an inspection target area is selected by using the electronic pen 2.

Suppose that at S111, for example, an area on the first floor which area has an area ID "A01" is designated as an inspection target area by using the electronic pen 2. In this case, as indicated by hatching in FIG. 11B, the area is notified to the user of the tablet type information terminal 1 in a highlighted state, for example. In this case, when another area is newly selected, the newly selected area is inverted, and the display of the area having the area ID "A01" is returned to normal display. Then, when the "OK" button is selected by the electronic pen 2, the area selected by the electronic pen 2 is determined as an inspection target area.

In addition, when the "search" button B3 is operated at S111, inspection area detection processing using a beacon is performed, as will be described later. At S111, it is also possible to operate the "return" button B1. Therefore, after the operating input reception processing at S111, the controller 102 proceeds to processing of FIG. 8, and determines whether or not the operating input received at S111 is an operating input to the "search" button B3 on the basis of coordinate data from the input device 300 (S112).

When determining in the determination processing at S112 that an operating input to the "search" button B3 is received, the controller 102 controls the short-range radio communication circuit 120 to perform inspection target area detection processing using a beacon signal (S113). In each area to be inspected, a base station is installed in advance which transmits a beacon signal such that the beacon signal can be received with a reception strength equal to or higher than a predetermined value within the area. Therefore, at S113, the controller 102 receives a beacon signal from a base station installed in advance in an area to be inspected, through the short-range radio communication antenna 120A and the short-range radio communication circuit 120.

When the controller 102 can receive a beacon signal with a reception strength equal to or higher than a certain value, the controller 102 extracts a base station ID included in the beacon signal. On the basis of the extracted base station ID, the controller 102 refers to an association table of base station IDs and inspection target areas, the association table being stored in the memory 103 of the device in advance, and identifies an inspection target area. When the area having the area ID "A01" on the first floor, for example, is identified as the inspection target area, the area is notified to the user of the tablet type information terminal 1 in a highlighted state, for example, as indicated by the hatching in FIG. 11B.

It is to be noted that while identifying an inspection target area by using a beacon signal from a base station has been described as the second method in the present embodiment, there is no limitation to this. In the processing at S113, as also described above, an inspection target area can be identified by various methods, for example by using a QR code (registered trademark), a bar code, or the like, using infrared communication, or using a GPS function.

In addition, when determining in the determination processing at S112 that no operating input to the "search" button B3 is received, the controller 102 determines whether or not the "return" button B1 is operated (S114). When determining in the determination processing at S114 that the "return" button is operated, the controller 102 repeats the processing from S107 in FIG. 7. The user of the tablet type information terminal 1 can thereby start over again with the selection of facilities to be inspected.

A case where it is determined in the determination processing at S114 that the "return" button B1 is not operated is a case where an inspection target area is selected by the electronic pen 2 and the "OK" button B3 is operated to make confirmation. In addition, after the processing at S113, an inspection target area has been identified by using a beacon signal, as also described above. Therefore, in the case where it is determined at S114 that the "return" button is not operated, and after the processing at S113, the controller 102 controls the mode switching circuit 117 to change the device to the photograph association mode (S115). Thus, an indicating operation by the electronic pen 2 other than indicating operations of the operating buttons or the like can be identified as an indication of a photograph association position.

Then, the controller 102 controls the drawing obtaining circuit 111 and the drawing display processing circuit 112 to perform drawing selection processing (S116). At S116, the controller 102 first controls the drawing obtaining circuit 111 to obtain the drawing data of an area design drawing or the like of the area set as the inspection target area from the drawing etc. DB 105. In the present embodiment, description will be made supposing that the area having the area ID "A01" at a corner on the lower side of the first floor is selected as the inspection target area, as depicted in FIG. 11B.

Figure 12A:
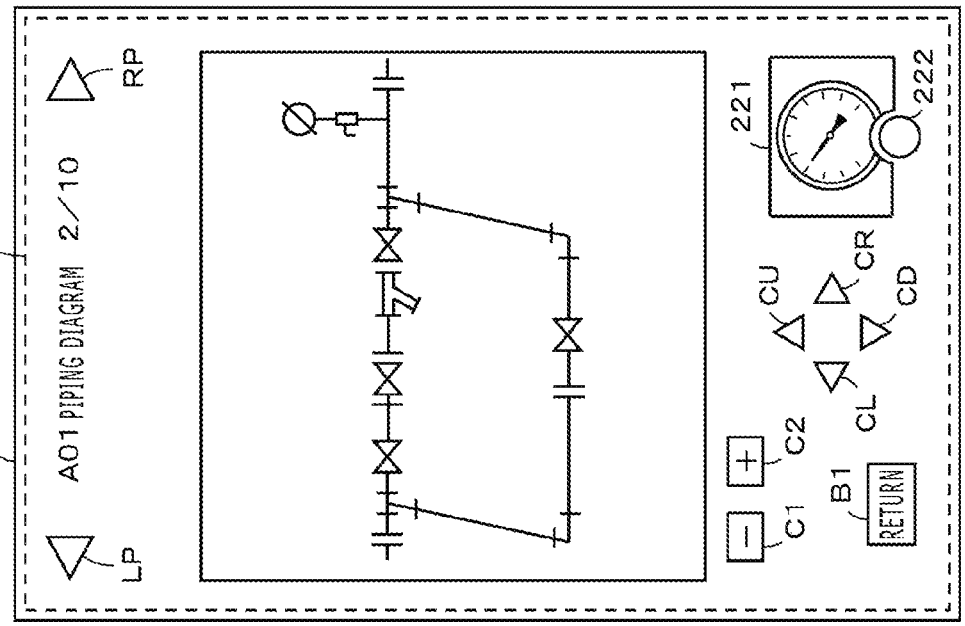
FIGS. 12A and 12B are diagrams of assistance in explaining display examples of the display screen during the inspection processing.

Next, the controller 102 controls the drawing display processing circuit 112 to display the drawing corresponding to the drawing data obtained through the drawing obtaining circuit 111 on the display screen 220 of the display 200. FIG. 12A is a diagram of assistance in explaining an example of a drawing display screen displayed on the display screen 220 of the display 200 at S116. The drawing display screen depicted in FIG. 12A displays the drawing corresponding to the obtained drawing data in a central part of the drawing display screen, and displays an area division "A01" indicating the inspection target area and a drawing type "piping diagram" in an upper end portion of the drawing display screen.

In the present example, the drawing displayed on the display screen 220 is a piping diagram of the inspection target area "A01." The piping diagram is depicted constituted by connecting gate valves having a shape obtained by joining two triangles together, a strainer having a shape obtained by laying down a katakana character "to," a flange represented by two parallel lines, a pressure gage represented by a round shape to which an oblique line is added, and the like. Then, suppose that the pressure gage, the gate valve, and the like present in an upper right end portion of the displayed drawing are inspection targets.

The drawing display screen further displays a page number "2/10" on the right side of the display of the drawing type. The display of the page number indicates that there are 10 drawings (10 pages) as area design drawings or the like related to the inspection target area and that a second drawing (second page) among the 10 drawings (10 pages) is now displayed.

Incidentally, the number of a numerator part in the display of the page number such as "2/10" or the like corresponds to the branch number of the drawing data depicted in FIG. 3B. In addition, as depicted in FIG. 12A, a left page change button LP is displayed in an upper left end portion, and a right page change button RP is displayed in an upper right end portion. Therefore, at S116, the displayed drawing can be changed by operating the left page change button LP or the right page change button RP by the electronic pen 2. The display of the page number is also changed when the page change button LP or RP is operated to change the drawing.

Further, as depicted in FIG. 12A, a lower right end portion of the drawing display screen is provided with a viewfinder region 221, and displays a shutter button 222. The viewfinder region 221 displays an image of a subject captured through the camera 22 of the electronic pen 2. In addition, when the shutter button 222 is operated, a still image of the subject can be photographed by controlling the camera 22 of the electronic pen 2 from the tablet type information terminal 1. In addition, a "return" button B1 is provided in a lower left end portion of the drawing display screen.

After displaying the drawing formed by the obtained drawing data on the display screen 220 of the display 200 by the drawing selection processing at S116, the controller 102 receives an operating input from the user through the input device 300 (S117). Then, the controller 102 determines whether or not the operating input received at S117 is an operating input to the "return" button B1 (S118).

Figure 7:
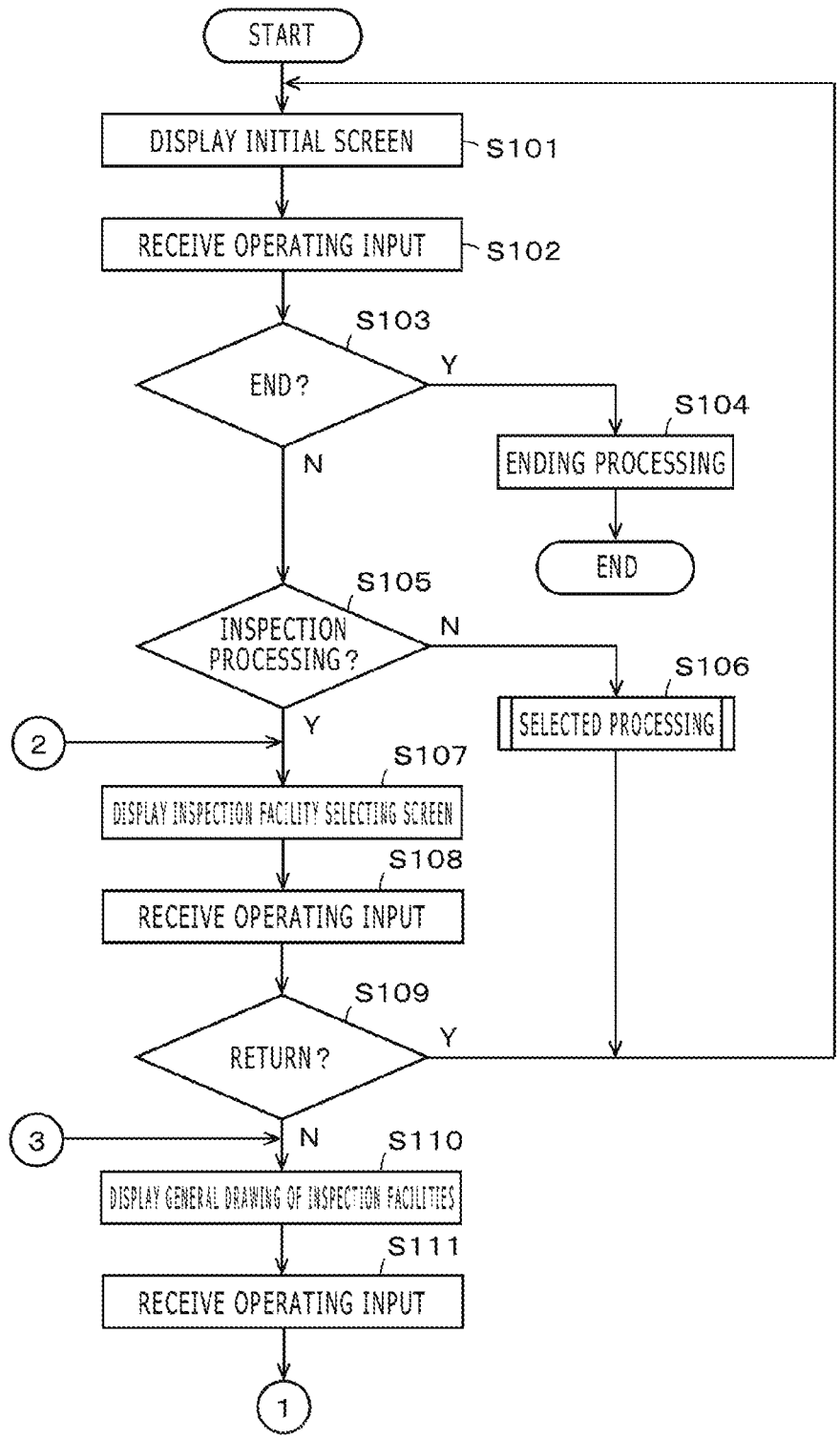
FIG. 7 is a flowchart of assistance in explaining processing performed by an information processing device of the tablet type information terminal.

When determining in the determination processing at S118 that the "return" button is operated, the controller 102 controls the mode switching circuit 117 to change from the photograph association mode to the normal processing mode (S119), and repeats the processing from S110 in FIG. 7. The user of the tablet type information terminal 1 can thereby perform the inspection target area selection processing again. Incidentally, the normal processing mode is a mode in which operating input to the input device 300 by the electronic pen 2 does not have a special meaning, but selection of a button or an icon, input of handwriting, or the like can be performed.

Suppose that it is determined in the determination processing at S118 that the "return" button B1 is not operated. In this case, the controller 102 determines whether or not the shutter button 222 displayed on the display screen 220 is operated on the basis of coordinate data from the input device 300 (S120). When determining in the determination processing at S120 that the shutter button 222 is not operated, the controller 102 repeats the processing from S116. The user of the tablet type information terminal 1 can thereby perform processing of selecting a drawing to be displayed on the display screen 220 again. When it is determined in the determination processing at S120 that the shutter button 222 is operated, taking of a photograph through the camera 22 of the electronic pen 2 and processing of recording photograph data and additional information are performed (S121). Specifically, at S121, the controller 102 controls the viewfinder control circuit 110 and the external I/F 119 to display a moving image of a subject imaged through the camera 22 of the electronic pen 2 in the viewfinder region 221 provided on the display screen 220.

Figure 12B:
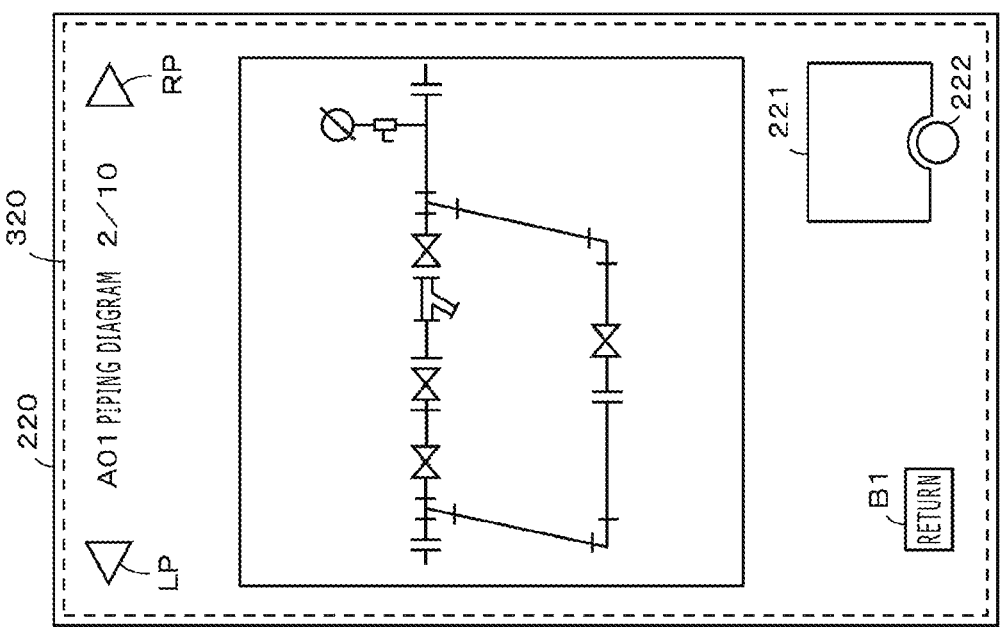

FIG. 12B is a display example in a case where the viewfinder region 221 displays an image of a pressure gage actually installed in the inspection target area (A01) and corresponding to the pressure gage present in the upper right end portion of the drawing displayed on the display screen 220, the image of the pressure gage being captured by the camera 22. As depicted in FIG. 12B, displaying the moving image captured through the camera 22 of the electronic pen 2 in the viewfinder region 221 provided on the display screen of the display 200 makes it possible to photograph a still image of the intended inspection target while checking the moving image displayed in the viewfinder region 221. Then, in the tablet type information terminal 1 according to the present embodiment, after a predetermined time from the operation of the shutter button 222, the controller 102 controls the imaging control circuit 109 to transmit an imaging instruction to the camera 22 of the electronic pen 2 through the external I/F 119. Receiving the imaging instruction, the camera 22 images the subject and obtains photograph data by imaging the image of the subject captured through the objective lens at that time and recording the image in the frame memory. Then, the camera 22 adds the pen ID as additional information to the photograph data obtained by the photographing, and supplies the photograph data to which the pen ID is added to the tablet type information terminal 1 through the I/F 23 and the cable 24.

Thus, when the shutter button 222 as a software key is operated, the tablet type information terminal 1 according to the present embodiment displays and makes viewable a moving image of a subject captured by the camera 22 of the electronic pen 2 in the viewfinder region 221. Then, a still image of the subject captured by the camera 22 of the electronic pen 2 can be photographed after a predetermined time from the operation of the shutter button 222.

In this case, under control of the controller 102, the imaging control circuit 109 obtains photograph data and the pen ID as additional information from the camera 22 of the electronic pen 2 through the external I/F 119. Then, the imaging control circuit 109 forms a photograph file as depicted in FIG. 4 which photograph file includes the obtained photograph data and the obtained pen ID, and records the photograph file in the photograph folder 104. Incidentally, in this stage, handwritten note data is left as a blank.

Incidentally, in the present example, a description has been made supposing that when the shutter button 222 is operated, a moving image is displayed in the viewfinder region 221, and that a subject is imaged and photograph data is obtained after a predetermined time from the operation of the shutter button 222. However, there is no limitation to this. For example, after a change to the photograph association mode at S115, a moving image of a subject captured through the camera 22 of the electronic pen 2 is displayed in the viewfinder region 221. When the shutter button 222 is then operated, the subject may be imaged and photograph data may be obtained. In addition, it is possible to display a moving image in the viewfinder region 221 first when the shutter button 222 is operated, and image a subject and obtain photograph data when the shutter button 222 is next operated.

After the processing at S121, the controller 102 receives an operating input from the user (S122). Then, the controller 102 determines whether or not the "return" button B1 is operated on the basis of coordinate data from the input device 300 (S123). When determining in the determination processing at S123 that the "return" button is operated, the controller 102 repeats the processing from S116. The user can thereby perform the processing of selecting a drawing to be displayed on the display screen again.

Figure 9:
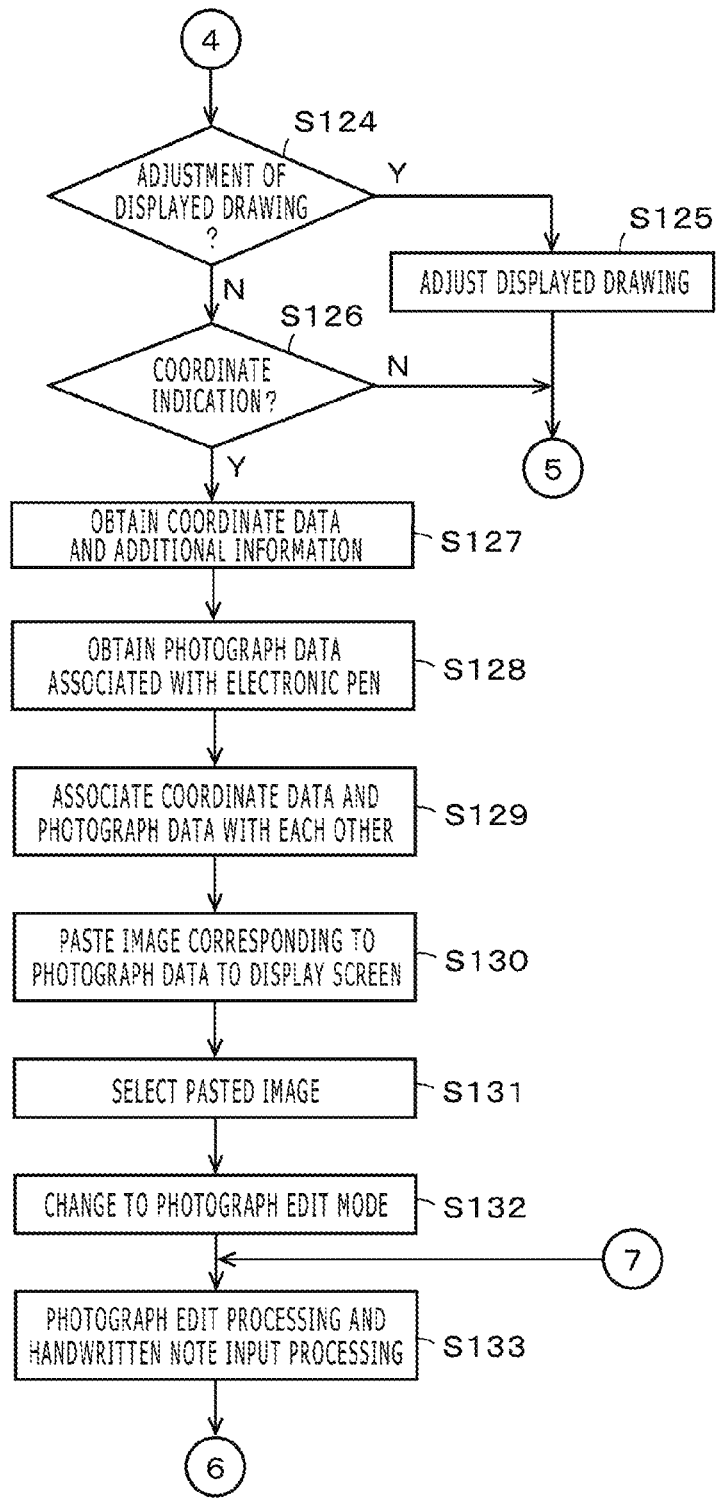
FIG. 9 is a flowchart continued from FIG. 8.

When determining in the determination processing at S123 that the "return" button is not operated, the controller 102 proceeds to processing of FIG. 9, and determines whether or not an operation of adjusting the displayed drawing is performed (S124). The processing at S124 determines whether or not a reducing button C1, an enlarging button C2, an upward moving button CU, a right moving button CR, a downward moving button CD, or a left moving button CL depicted in FIG. 12B is operated on the basis of coordinate data from the input device 300.

Specifically, in the display example depicted in FIG. 12B, a "return" button is displayed in a lower left end portion, and the reducing button C1, the enlarging button C2, the upward moving button CU, the right moving button CR, the downward moving button CD, and the left moving button CL are displayed as buttons for editing the displayed drawing. Operations of these buttons are also made possible.

When determining in the determination processing at S124 that an operation of adjusting the displayed drawing is performed, the controller 102 controls the drawing display processing circuit 112 to perform displayed drawing adjustment processing according to the operating input from the user (S125). Specifically, processing such as reduction/enlargement of the displayed drawing, movement of the displayed drawing, or the like is performed. Thus adjusting the displayed drawing can facilitate association of the taken photograph with a target position in the displayed drawing.

Figure 8:
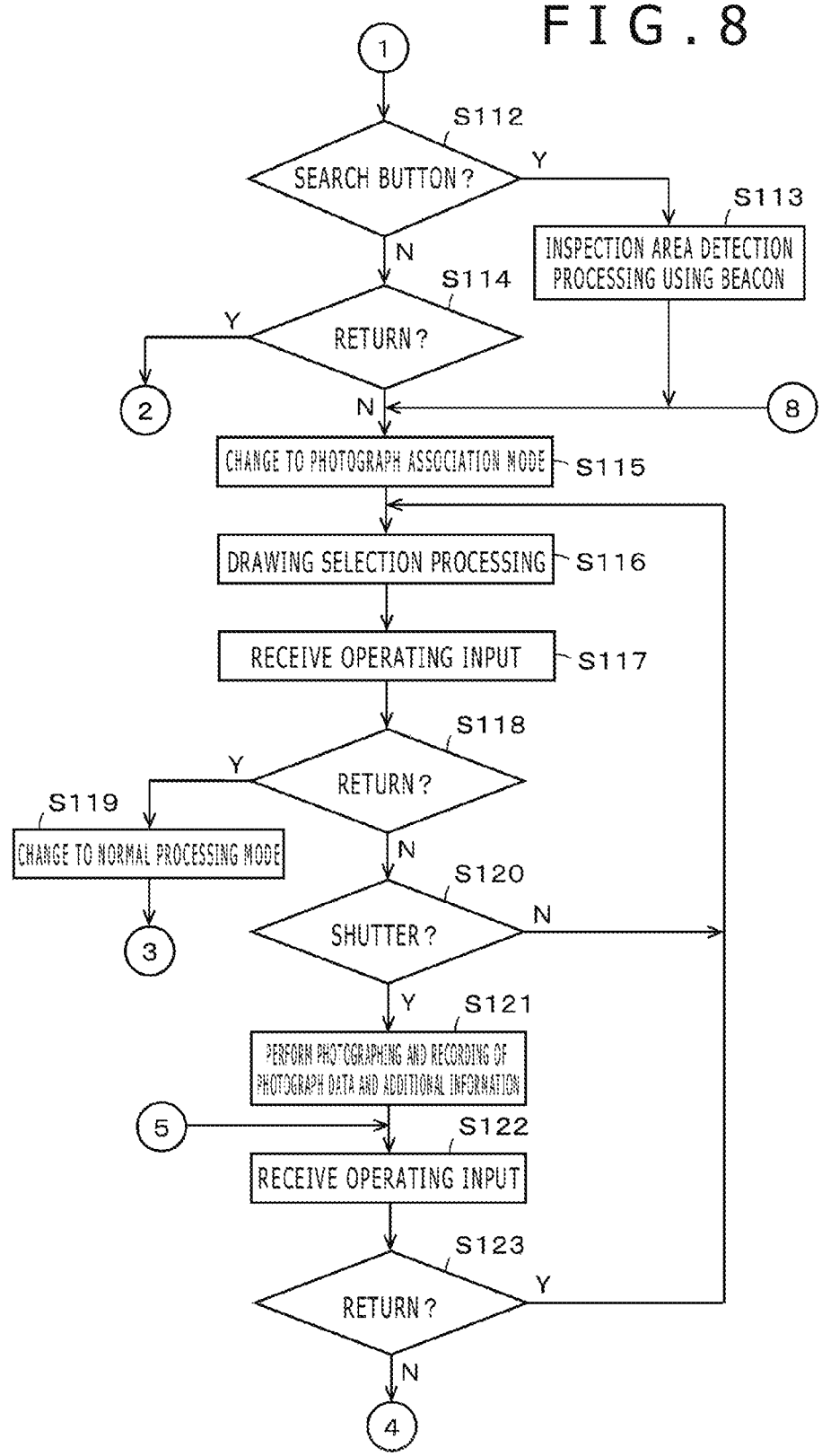
FIG. 8 is a flowchart continued from FIG. 7.

After the processing at S125, the processing from S122 in FIG. 8 is repeated. It is thus possible to select the "return" button B1 or continue the displayed image adjustment processing.

When determining in the determination processing at S124 that no operation of adjusting the displayed drawing is performed, the controller 102 determines whether or not a coordinate indication for associating (pasting) the photograph is received (S126). The tablet type information terminal 1 according to the present embodiment changes to the photograph association mode at S115 of the processing depicted in FIG. 8. The controller 102 therefore determines that an indicating operation other than indicating operations of the displayed operating buttons by the electronic pen 2 is a coordinate indication indicating a photograph association position.

When determining in the determination processing at S126 that no coordinate indication indicating a photograph association position is received, no valid operating input is received, and therefore the processing from S122 in FIG. 8 is repeated. It is thus possible to select the "return" button B1 or continue the displayed image adjustment processing.

FIG. 13A is a diagram of assistance in explaining processing of specifying an association position of the photograph corresponding to the photograph data associated with the electronic pen 2, and is a diagram of assistance in concretely explaining processing from S127 on down. Suppose that the drawing is displayed in a state in which a region thereof displayed on the display screen 220 is changed by repeating the processing at S122 to S125, for example, by enlarging the drawing and moving the display region, as depicted in FIG. 13A.

Specifically, suppose that, as depicted in FIG. 13A, the drawing is enlarged and displayed on the display screen 220 with the part of the pressure gage at a center, to associate the photograph of the real pressure gage with the vicinity of the pressure gage present on the upper right of the drawing (piping diagram) displayed on the display screen 220. Suppose that at this time, as depicted in FIG. 13A, an operation of bringing the pen tip of the electronic pen 2 into contact with a target position P on the display screen 220 is performed.

In this case, it is determined in the determination processing at S126 that a coordinate indication indicating a photograph association position is received. In this case, the controller 102 obtains coordinate data and the pen ID as additional information provided from the input device 300 (S127). Thus, the pen ID obtained together with the coordinate data from the electronic pen 2 through the input device 300 functions as first additional information.

The controller 102 then controls the photograph obtaining circuit 106 to obtain the photograph data associated with the electronic pen 2 from the photograph folder 104 (S128). At S128, the photograph obtaining circuit 106 obtains the photograph data associated with the electronic pen 2 on the basis of the pen ID (first additional information) obtained at S127 and the pen ID (second additional information) added to the photograph data stored in the photograph folder. That is, the photograph data to which the same pen ID as the pen ID obtained from the electronic pen 2 is added is obtained.

Therefore, even when the photograph folder 104 stores photograph data obtained by photographing using a digital camera or the like, for example, only the photograph data obtained by imaging through the camera 22 of the electronic pen 2 can be obtained. That is, the photograph data not related to the electronic pen 2 is not obtained.

The controller 102 thereafter controls the first associating circuit 107 to associate the coordinate data indicating a coordinate position indicated by the electronic pen 2, the coordinate data being obtained at S127, and the photograph data obtained at S128 with each other (S129). Thus, an image corresponding to the photograph data can be displayed at the position on the display screen 220 which position is indicated by the coordinate data.

Therefore, the controller 102 controls the photograph associating circuit 108 to display a thumbnail image corresponding to the photograph data associated at S129 at the position on the display screen 220 which position is indicated by the coordinate data associated at S129 (S130). Thus, as depicted in FIG. 13B, a thumbnail image Sn corresponding to the photograph data obtained at S128 can be associated with (pasted at) the position P on the display screen 220 which position is indicated by the electronic pen 2.

Incidentally, there is also a case where the photograph folder 104 stores the photograph data of a plurality of photographs that are imaged through the camera 22 of the electronic pen 2 and to which the pen ID of the electronic pen 2 is added as additional information. In such a case, the photograph data of the plurality of photographs associated with the electronic pen 2 is obtained at S128. In this case, the processing at S129 and S130 is slightly different.

FIG. 13B is a diagram of assistance in explaining processing in a case where there are a plurality of pieces of photograph data associated with the electronic pen 2. Suppose that the photograph data of a plurality of photographs associated with the electronic pen 2 is obtained at S128. In this case, under control of the controller 102, the first associating circuit 107 associates the coordinate data corresponding to the position P indicated by the electronic pen 2 with each of the plurality of pieces of obtained image data (S129).

Then, under control of the controller 102, the photograph associating circuit 108 performs processing of displaying, on the display screen 220, thumbnail images of the photographs corresponding to the plurality of pieces of obtained photograph data (S130). Specifically, at S130, as depicted in FIG. 13B, the photograph associating circuit 108 sets the position P indicated by the user using the electronic pen 2 as a reference position. Then, the photograph associating circuit 108 displays thumbnail images Sn1, Sn2, Sn3, ... of the photographs corresponding respectively to the plurality of pieces of photograph data associated with the coordinate data corresponding to the indicated position P (S129). FIG. 13B represents a case where the thumbnail images of the plurality of photographs are displayed so as to have overlapping parts while slightly displaced from each other.

Then, under control of the controller 102, the photograph associating circuit 108 functions to perform processing of selecting photograph data to be associated, using the plurality of displayed thumbnail images (S131). An operation of bringing the tip of the electronic pen 2 into contact with a position on the display area of a target thumbnail image is received at S131. In this case, the photograph associating circuit 108 performs processing so as to display the thumbnail image having the indicated position in the display area thereof on a nearest side of all of the thumbnail images so that the whole of the thumbnail image is viewable.

Thus, the user can view the whole of the thumbnail image to determine whether or not the thumbnail image is an intended photograph. When the thumbnail image is not an intended photograph, the tip of the electronic pen 2 is brought into contact with a position on the display area of another thumbnail image to display the whole of the thumbnail image. By repeating such processing, the user can check the whole of each thumbnail, and search for an intended photograph.

When an intended photograph is found, the user, for example, performs an operation of double-tapping a position on the display area of the thumbnail image using the electronic pen 2. When the double-tapping operation is received, the photograph associating circuit 108 selects the photograph data corresponding to the double-tapped thumbnail image as photograph data used for association. Then, the photograph associating circuit 108 displays the thumbnail image of one photograph corresponding to the photograph data at a position set with the initial position P indicated by the electronic pen 2 as a reference in the mode depicted in FIG. 13A.

Such a series of processing for selecting photograph data is performed at S131. Incidentally, when there is only one piece of photograph data obtained at S128, the photograph data is selected as photograph data to be associated at S131.

After the processing at S131, under control of the controller 102, the mode switching circuit 117 functions to change to the photograph edit mode (S132). Thus, operating input to the sensor 320 of the input device 300 by the electronic pen 2 is regarded as editing operation on the photograph or handwritten note input operation. The controller 102 then controls the photograph display processing circuit 115 to display the photograph corresponding to the photograph data selected at S131 on the display screen 220 and receive an editing operation on the photograph or a handwritten note input operation (S133).

Incidentally, though not depicted in FIG. 9 to simplify description, the position indicated by the electronic pen 2 as depicted in FIG. 13A may be desired to be changed. In such a case, an operation of changing the indicated position P can be performed, the operation including, for example, canceling the indication of the indicated position P by operating a "cancel" button B4 provided in the lower left end portion of the display screen 220 in FIG. 13A, indicating an indicated position again, and confirming the indicated position by operating an "OK" button B5.

Figure 14B:
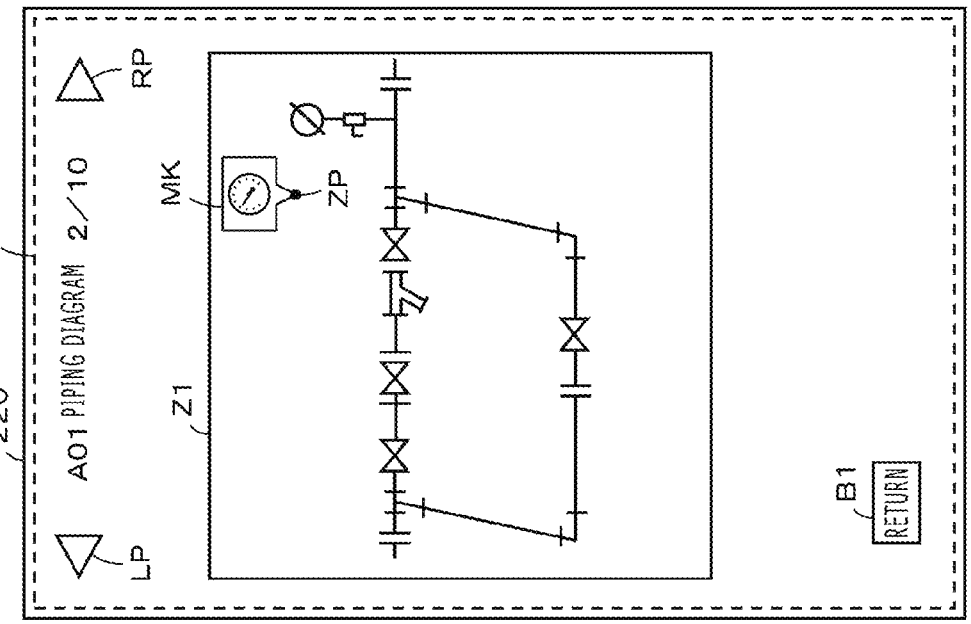
FIGS. 14A and 14B are diagrams of assistance in explaining display examples of the display screen during the inspection processing.
Figure 14A:
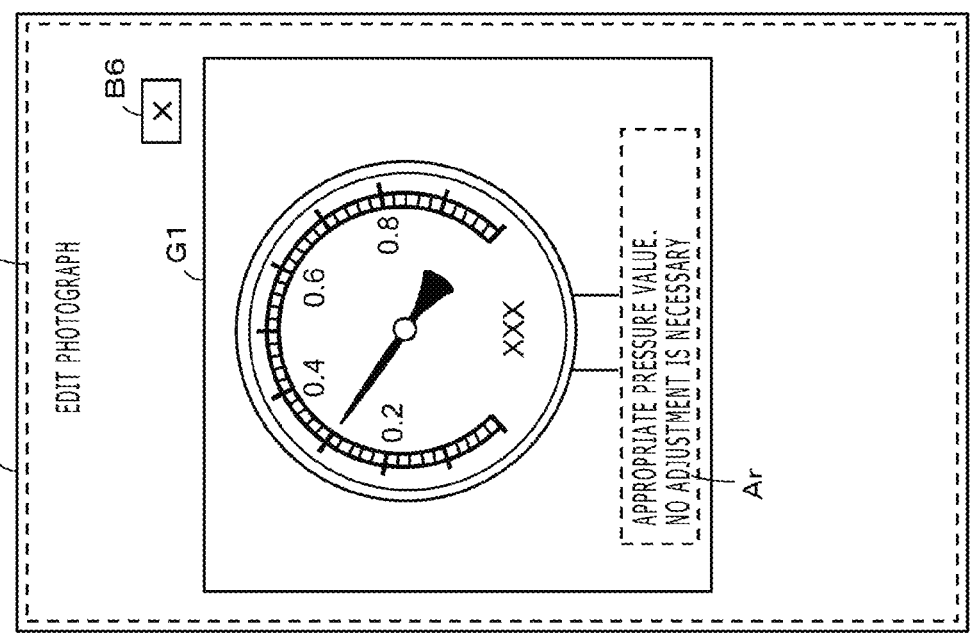

FIG. 14A is a diagram of assistance in explaining an example of an editing screen for the photograph displayed on the display screen 220 at S133. A photograph G1 corresponding to the photograph data selected at S131 is displayed in a central part of the display screen 220, and also a "close" button B6 is displayed. Then, in the present example, when a hovering operation on the sensor 320 is performed by using the electronic pen 2, the edit processing circuit 116 functions so as to enable reduction/enlargement of the photograph G1.

Specifically, the so-called hovering operation is performed over a detection area of the sensor 320 of the input device 300, the detection area corresponding to an area on the display screen 220 which area displays the photograph G1, the hovering operation bringing the pen tip of the electronic pen 2 closer to the detection area or moving away the pen tip of the electronic pen 2 from the detection area. The edit processing circuit 116 thereby functions so as to enable reduction/enlargement of the photograph G1 displayed on the display screen 220. Specifically, the input device 300 detects a distance from the electronic pen 2 to the sensor 320, and notifies the distance to the controller 102. The controller 102 controls the edit processing circuit 116 so as to enable reduction/enlargement of the photograph G1 on the basis of the distance. As an example, the photograph G1 is reduced when the electronic pen 2 is brought closer to the sensor 320, and the photograph G1 is enlarged when the electronic pen 2 is moved away from the sensor 320.

In addition, under control of the controller 102, the edit processing circuit 116 receives a writing operation by the electronic pen 2 on a handwritten note adding area Ar on the sensor 320 of the input device 300 so that a handwritten note can be input. Thus, as depicted in FIG. 14A, for example, a handwritten note, such as "Normal pressure value. No adjustment is necessary" or the like, can be input to the handwritten note adding area Ar as required.

Figure 10:
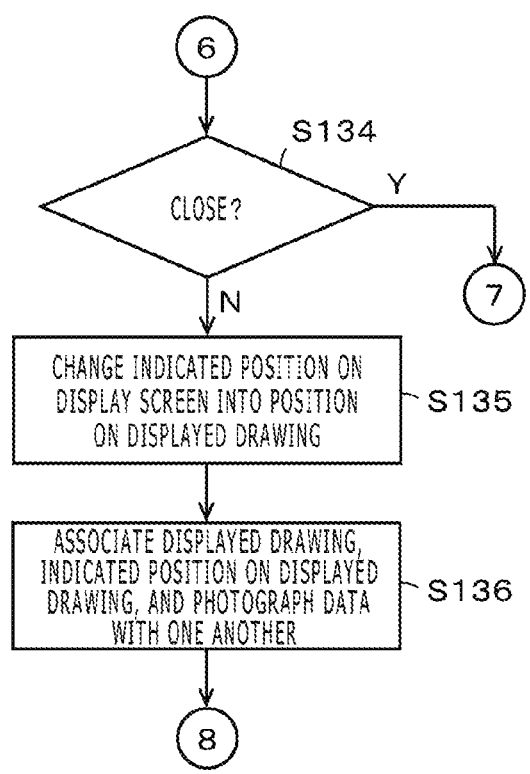
FIG. 10 is a flowchart continued from FIG. 9.

The controller 102 then proceeds to processing of FIG. 10, and determines whether or not the "close" button is operated (S134). When it is determined that the "close" button is not operated, the processing from S133 in FIG. 9 is repeated. It is thus possible to continue the photograph edit processing and the handwritten note input processing.

When it is determined in the determination processing at S134 that the "close" button is operated, it can be determined that the photograph edit processing on the displayed photograph G1 and the handwritten note input processing are completed. In this case, the controller 102 controls the coordinate transforming circuit 113 to perform processing of transforming the position P indicated by the electronic pen 2 on the display screen 220 into a position on the displayed drawing (S135).

Figure 15:
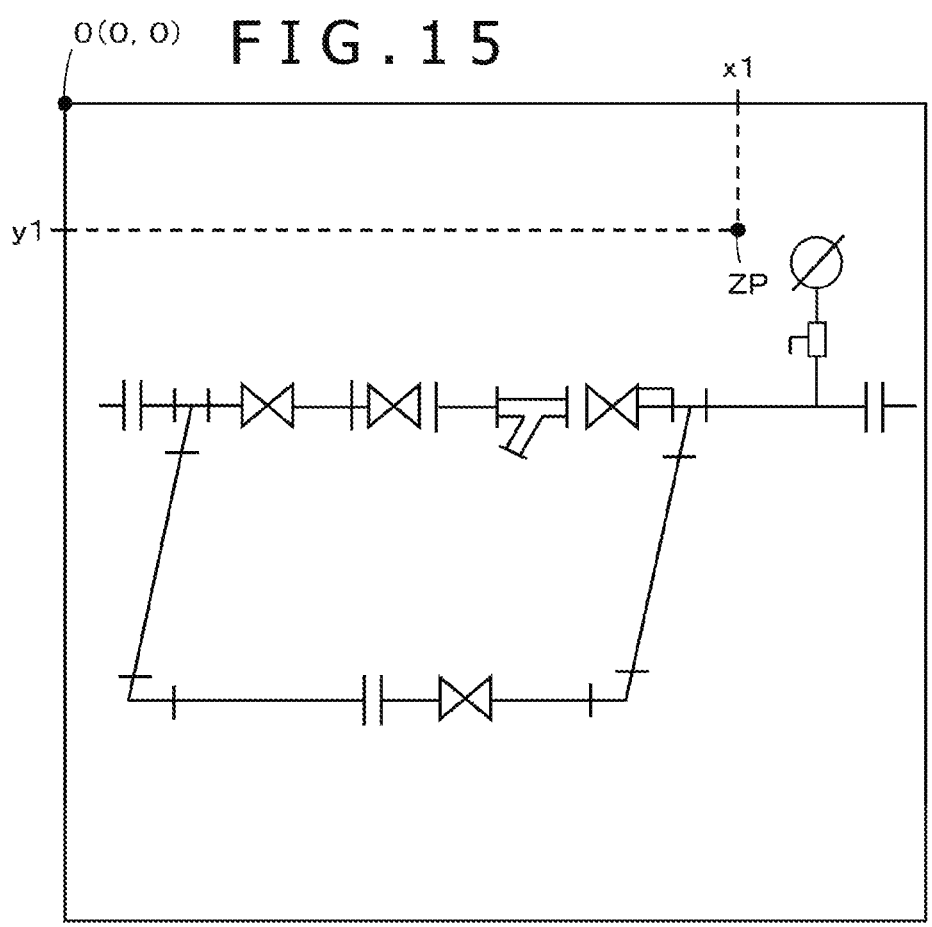
FIG. 15 is a diagram of assistance in explaining processing of transforming an indicated position on the display screen into a position on a displayed drawing.

FIG. 14B is a diagram of assistance in explaining the indicated position on the displayed drawing. FIG. 15 is a diagram of assistance in explaining the processing of transforming the indicated position on the display screen 220 into a position on the displayed drawing. In the example depicted in FIGS. 13A and 13B, the selected drawing (piping diagram as an area design drawing in the present example) of the inspection target area is enlarged, and a display target area on the display screen 220 is moved, so that a target drawing part is displayed on the display screen 220.

Because the photograph association (pasting) position P is indicated in this state, the indicated position on the displayed drawing is a position in the vicinity of the pressure gage on the upper right of the drawing when the whole of the displayed drawing is displayed on the display screen 220, as depicted in FIG. 14B. Therefore, the coordinate transforming circuit 113 identifies the indicated position P on the display screen 220 which position is indicated as depicted in FIGS. 13A and 13B as an indicated position ZP on a coordinate system corresponding to the displayed drawing having an upper left end thereof as an origin O (0, 0), for example, as depicted in FIG. 15. The coordinate transforming circuit 113 then identifies coordinate data (X1, Y1) of the indicated position ZP in the coordinate system corresponding to the displayed drawing depicted in FIG. 15. Consequently, the indicated position P on the display screen which position is indicated as depicted in FIGS. 13A and 13B is transformed into the indicated position ZP on the displayed drawing, as depicted in FIG. 14B and FIG. 15.

Thereafter, the controller 102 controls the second associating circuit 114 to associate the three of the displayed drawing, the indicated position ZP (X1, Y1) on the displayed drawing, and the selected photograph data with each other (S136). Specifically, the second associating circuit 114 forms associated data in which the three of the displayed drawing, the indicated position ZP (X1, Y1) on the displayed drawing, and the selected photograph data are associated with each other. FIG. 16 is a diagram of assistance in explaining an example of the associated data formed by the second associating circuit 114.

As depicted in FIG. 16, the second associating circuit 114 inputs the facility ID, the type, the floor, the area ID, and the branch number to corresponding sections of the associated data. As described with reference to FIG. 3B, these pieces of information are the metadata added to the drawing data of the displayed drawing, and can be obtained from the drawing file of the drawing data forming the displayed drawing. Further, the second associating circuit 114 inputs the photograph ID added to the selected photograph data to a photograph ID section, and inputs the transformed indicated position ZP (X1, Y1) on the displayed drawing to a corresponding associated position section. Consequently, the three of the displayed drawing, the indicated position ZP (X1, Y1) on the displayed drawing, and the selected photograph data are associated with each other.

In addition, in the present example, the handwritten note data input to the photograph G1 as described with reference to FIG. 14A is stored in a handwritten note data section of the photograph file storing the corresponding photograph data as described with reference to FIG. 4. Processing of updating the handwritten note data in the photograph file is performed by the second associating circuit 114, for example. Of course, the processing of updating the handwritten note data in the photograph file may be performed separately by another processing such as the edit processing circuit 116 or the like. The thus formed associated data is, for example, stored and retained in a predetermined area of the memory 103, and can be read and used repeatedly as required.

The controller 102 thereafter repeats the processing from S115 depicted in FIG. 8. Thus, it is also possible to add different photograph data to a different indicated position of the one displayed drawing. Therefore, as depicted in FIG. 16, in the associated data, the photograph IDs of a plurality of pieces of photograph data and a plurality of different associated positions can be associated with the one displayed drawing.

Then, when the associated data depicted in FIG. 16 is used, the thumbnail image MK of the associated photograph can be displayed at the indicated position ZP on the target drawing, and provided to the user, as depicted in FIG. 14B, for example. Of course, when the thumbnail image MK is indicated by the electronic pen in the display depicted in FIG. 14B, only the photograph can be displayed and provided in the mode depicted in FIG. 14A. In addition, when the displayed drawing is enlarged and moved in the display depicted in FIG. 14B, both the displayed drawing and the thumbnail image of the photograph can be displayed and provided in an enlarged state in the mode depicted in FIG. 13A.

Effects of First Embodiment

According to the tablet type information terminal 1 and the electronic pen 2 in accordance with the first embodiment described above, photograph data associated with the electronic pen 2 can be obtained. Then, the obtained photograph data and an indicated position on the display screen 220 which position is indicated by the electronic pen 2 can be associated with each other. Thus, the photograph data associated with the electronic pen 2 can be displayed in association with the indicated position on the display screen.

In addition, when a drawing is displayed on the display screen 220, the position indicated by the electronic pen 2 can be transformed into an indicated position on the displayed drawing, and the displayed drawing, the photograph data associated with the electronic pen 2, and the indicated position on the displayed drawing can be associated with each other. Therefore, an associated photograph can be pasted and displayed at the indicated position on the displayed drawing.

Thus, the photograph data associated with the electronic pen 2 can be associated with the indicated position on the display screen and associated with the indicated position on the displayed drawing easily. Therefore, only the photograph taken in inspection work can be managed in association with the position on the drawing used in the inspection work, for example. The photograph and the drawing can be thus managed in association with each other easily.

Modifications of First Embodiment and Others

In the first embodiment described above, photograph data associated with the electronic pen 2, the photograph data being an object for association, is obtained by performing authentication using the pen ID of the electronic pen 2, and an image corresponding to the photograph data is associated with a position on the display screen which position corresponds to a position indicated by the electronic pen 2. However, there is no limitation to this.

In a case where the sensor 320 of the input device 300 is a capacitive type sensor, position indication can be performed by a finger of a user. In this case, the pen ID or the like is not transmitted from the finger of the user. There are also an electronic pen without a pen ID and an electronic pen that does not include a pen ID in a position indication signal. In such a case, an image corresponding to photograph data to which association image specific information is added can be associated with a position on the display screen which position corresponds to an indicated position on the sensor, the indicated position being indicated by a position indicator such as the finger of the user or the like.

Incidentally, in the present specification, the words "indicating body" are used to include both a finger of a user and an electronic pen that does not transmit additional information such as a pen ID or the like as a position indication signal. In addition, the words "position indicator" mean mainly an electronic pen that can send out a position indication signal including additional information such as a pen ID or the like.

Even in a case where no pen ID is used as described above, it is basically possible to perform the processing described with reference to the flowcharts of FIGS. 7 to 10. However, the processing at S128 depicted in FIG. 9 is different. Specifically, in a case where association with the electronic pen by the pen ID is not performed, it suffices to obtain photograph data to which predetermined association image specific information is added from the photograph folder 104, for example, in the processing at S128 in FIG. 9. Information known only to a person performing inspection, such, for example, as a user ID, an inspection code, or the like, is preferably used as the association image specific information in this case.

The user adds the association image specific information to the photograph data at a time point of storing the photograph data in the photograph folder 104, for example. In addition, the user registers the association image specific information in a predetermined storage area of the memory 103. Then, as described above, in the processing at S128 in FIG. 9, it suffices for the controller 102 to control the photograph obtaining circuit 106 to obtain the photograph data to which the same information as the association image specific information registered in the memory 103 is added from the photograph folder 104.

It is thus possible to promptly obtain an appropriate image such as a photograph set as an association object or the like, associate the image with a coordinate position on the display screen which coordinate position is indicated by a finger of a user or an electronic pen without a pen ID, and use the image and the coordinate position associated with each other. That is, even when a finger of a user or an electronic pen without a pen ID is used, it is possible to obtain only a special image for association, associate the image with coordinate data corresponding to a position indicated by a finger of a user or an electronic pen without a pen ID, and use the image and the coordinate data associated with each other.

In addition, in the first embodiment described above, the pen ID as second additional information is added to photograph data obtained by imaging through the camera 22 of the electronic pen 2, and the pen ID is output. The pen ID is also added as first additional information to a position indication signal generated and transmitted by a function of the electronic pen circuit 21 of the electronic pen 2, and the pen ID is output. However, there is no limitation to this.

Figure 17:
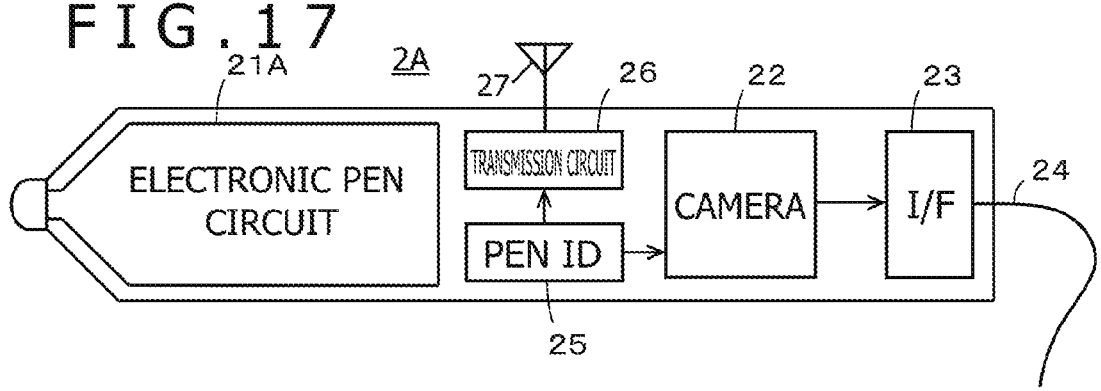
FIG. 17 is a block diagram of assistance in explaining another example configuration of the electronic pen according to the embodiment.

The pen ID as the first additional information may be transmitted by using radio communication in accordance with the Bluetooth (registered trademark) standard, for example. FIG. 17 is a diagram of assistance in explaining an example configuration of an electronic pen 2A that transmits a pen ID by radio communication in accordance with the Bluetooth (registered trademark) standard, for example, separately from a position indication signal. In addition, FIG. 18 is a diagram of assistance in explaining a connection relation between a tablet type information terminal having a function of receiving the pen ID transmitted by the radio communication and the electronic pen.

In FIG. 17, parts configured in a manner similar to those of the electronic pen 2 depicted in FIG. 5 are identified by the same reference numerals, and detailed description of the parts will be a repeated description, and therefore be omitted. In addition, in FIG. 18, parts configured in a manner similar to the parts of the tablet type information terminal 1 depicted in FIG. 6 are identified by the same reference numerals, and detailed description of the parts will be a repeated description, and therefore be omitted.

The electronic pen circuit 21A of the electronic pen 2A depicted in FIG. 17 forms and transmits a position indication signal, but forms and transmits a position indication signal not including the pen ID of the device. The electronic pen 2A in the present example includes a pen ID memory 25 as well as a transmission circuit 26 and a transmitting antenna 27 in accordance with the Bluetooth (registered trademark) standard, for example, and transmits the pen ID of the device through the transmission circuit 26 and the transmitting antenna 27. Incidentally, a configuration in which the pen ID in the pen ID memory 25 is added to photograph data obtained by imaging through the camera 22 and the photograph data having the pen ID added thereto is transmitted through the I/F 23 is similar to that of the electronic pen 2 depicted in FIG. 5.

Figure 18:
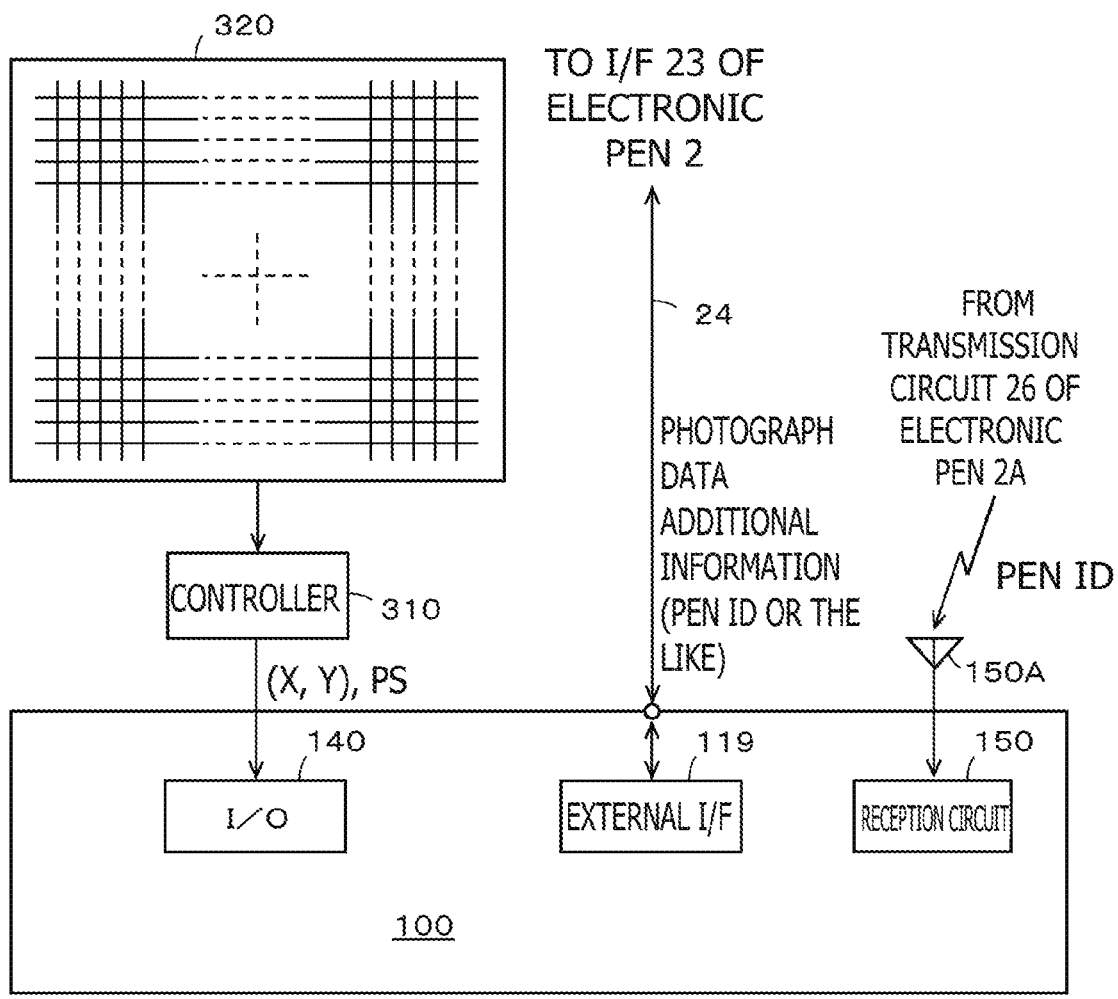
FIG. 18 is a diagram of assistance in explaining a connection relation between the tablet type information terminal according to the embodiment and the electronic pen depicted in FIG. 17.

In correspondence with this, as depicted in FIG. 18, a reception circuit 150 and a reception antenna 150A in accordance with the Bluetooth (registered trademark) standard are provided on the tablet type information terminal 1 side. Therefore, the pen ID as first additional information transmitted from the electronic pen 2A by radio can be received through the reception antenna 150A and the reception circuit 150, and used for obtainment of appropriate photograph data and authentication in the information processing device 100. The pen ID as the first additional information can be thus transmitted through another radio communication path than that of the position indication signal.

Figure 19:
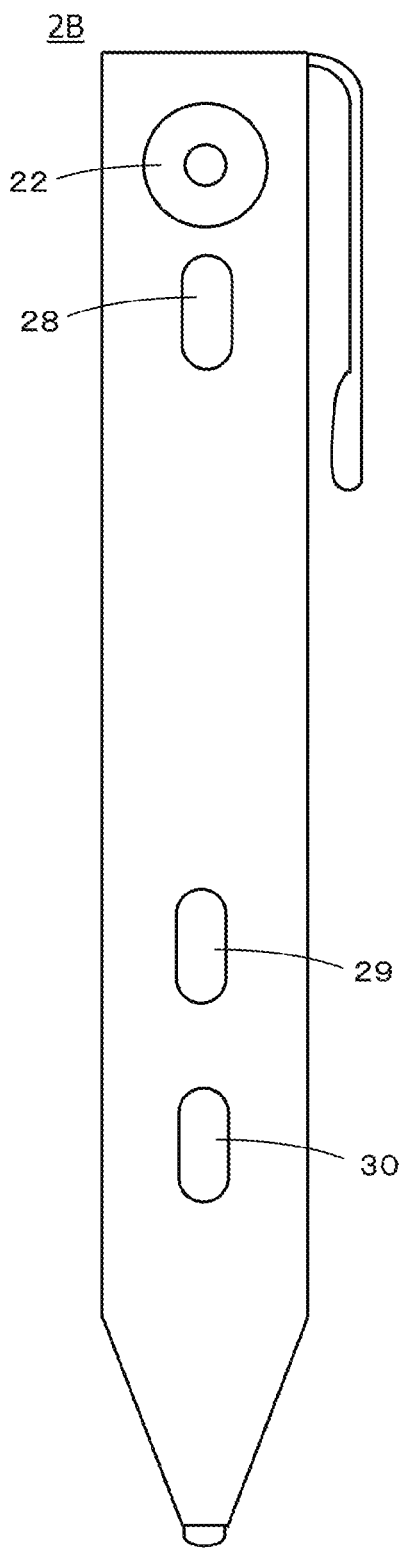
FIG. 19 is a diagram of assistance in explaining another example of the electronic pen.

In addition, in the first embodiment described above, the electronic pen 2 does not have any operating button. However, there is no limitation to this. FIG. 19 is a diagram of assistance in explaining a modification of the electronic pen. For example, as depicted as an electronic pen 2B of FIG. 19, the electronic pen may be provided with operating buttons such as a shutter button 28 and side switches 29 and 30 or the like. When the shutter button 28 is provided to the electronic pen side as depicted in the electronic pen 2B, an operation of taking a photograph can be performed by the shutter button provided to the electronic pen 2B, so that operability can be improved.

FIGS. 20A and 20B are diagrams of assistance in explaining an example of methods of using the side switches 29 and 30 of the electronic pen 2B. When one of the side switches 29 and 30 is depressed, for example, the frequency of the position indication signal transmitted from the electronic pen 2B is changed according to the operated side switch. Thereby the operated side switch can be recognized on the input device 300 side.

Suppose that the electronic pen 2B is moved while in contact with the sensor 320 in a state in which the side switch 29 is operated, as indicated by the side switch 29 in a filled-in state in FIG. 20A. In this case, it is determined on the information processing device 100 side that a drag operation on a displayed image is performed, and the whole of the displayed drawing can be moved.

In addition, suppose that the electronic pen 2B is brought into contact with the sensor 320 in a state in which the side switch 30 is operated, as indicated by the side switch 30 in a filled-in state in FIG. 20B. In this case, it is determined on the information processing device 100 side that an operation of indicating a photograph association position is performed, and a thumbnail image corresponding to selected photograph data can be associated (pasted) with the indicated position P as a reference.

When the electronic pen is thus provided with the shutter button 28 and the side switches 29 and 30, taking of a photograph, dragging movement of a display image, specification of a photograph association position, and the like can be performed by a simpler operation.

Figure 21:
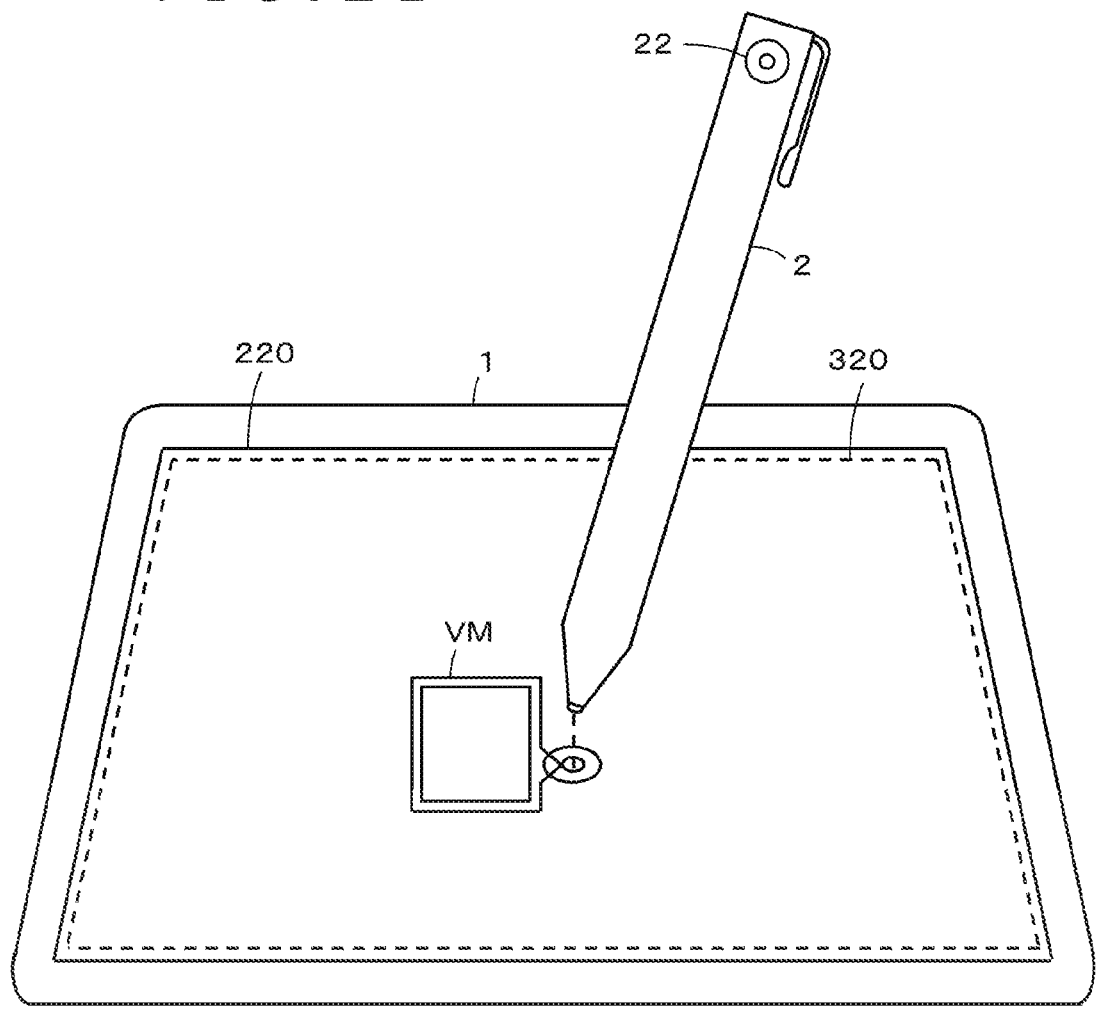
FIG. 21 is a diagram of assistance in explaining the checking of the association position of a photograph by a hovering operation.

In addition, in the first embodiment described above, the association position of a photograph corresponding to selected photograph data is indicated by bringing the tip of the electronic pen 2 into contact with a position on the sensor 320. In this case, the association position of the photograph can be checked by a hovering operation, for example. FIG. 21 is a diagram of assistance in explaining the checking of the association position of a photograph by a hovering operation.

Suppose that as depicted in FIG. 21, at a time of the photograph association mode, the tip of the electronic pen 2 is brought closer to the sensor 320 to within a predetermined distance or less without being in contact with the sensor 320. In this case, while the electronic pen 2 is close to the sensor 320 at the predetermined distance or less, a thumbnail image VM corresponding to selected photograph data is displayed on the display screen 220 with a position on the sensor 320 at which position a position indication signal from the electronic pen 2 is received as a reference.

The position on the display screen 220 with which position to associate the selected photograph data is thus checked. Then, when the association position is considered to be undesirable, the display position of the thumbnail image VM is sequentially changed by changing the position of the electronic pen 2 so that an appropriate display position can be located. When an appropriate display position can be identified, the indicated position can be identified as the associated position of the photograph data by bringing the electronic pen 2 into contact with the corresponding position on the sensor 320.

Figure 22:
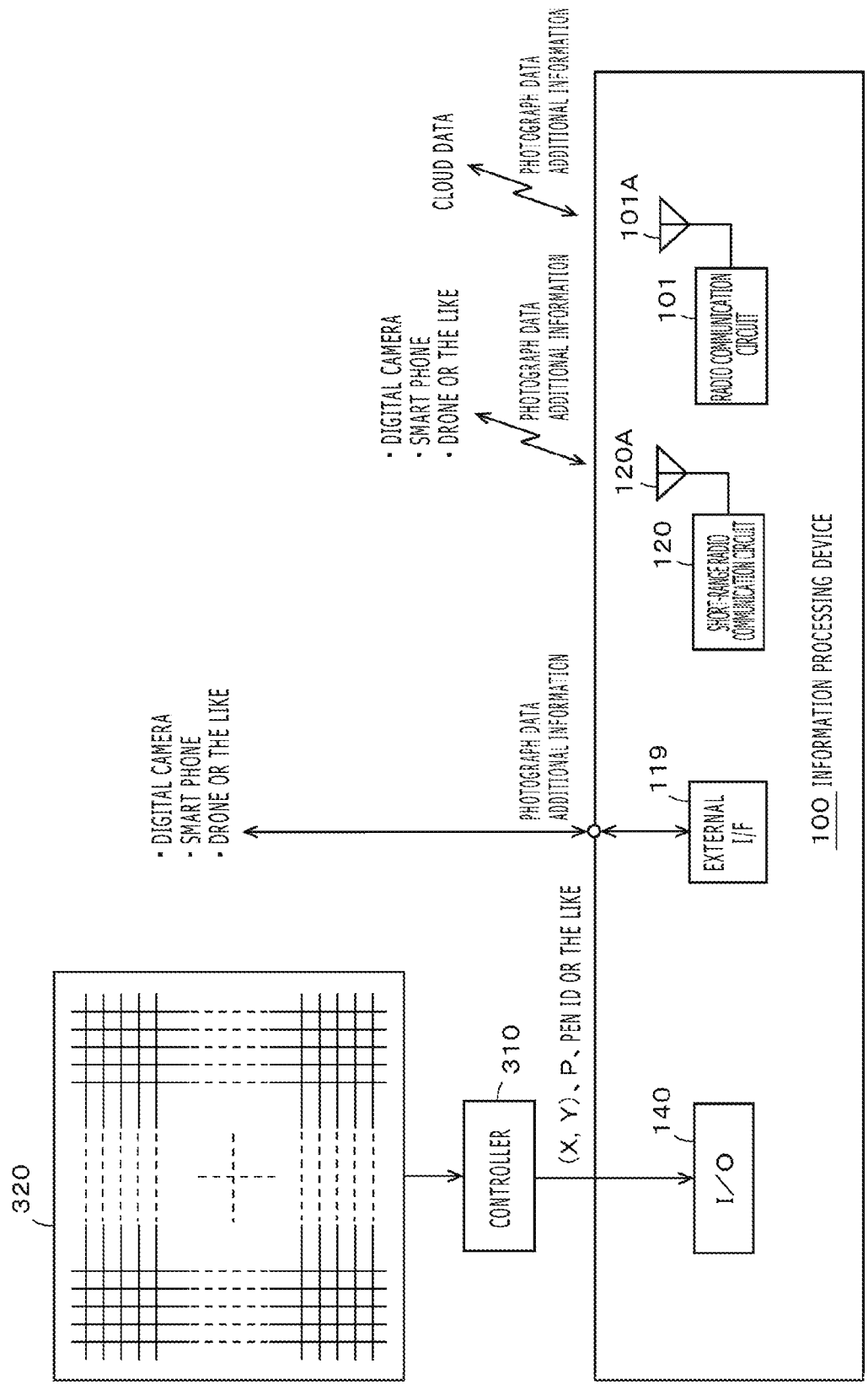
FIG. 22 is a diagram of assistance in explaining obtainment sources and obtainment paths of photograph data and additional information.

In addition, the tablet type information terminal 1 can obtain photograph data and additional information from other than the camera 22 of the electronic pen 2. FIG. 22 is a diagram of assistance in explaining obtainment sources and obtainment paths of photograph data and additional information. As depicted in FIG. 22, it is possible to establish wired connection to a digital camera, or a smart phone, an unmanned flying object referred to as a drone, or the like having a camera function through the external I/F 119, obtain photograph data and additional information from the digital camera, the smart phone, the drone, or the like, and control the digital camera, the smart phone, the drone, or the like.

It is also possible to establish radio connection to a digital camera, or a smart phone, a drone, or the like having a camera function through the short-range radio communication antenna 120A and the short-range radio communication circuit 120, obtain photograph data and additional information from the digital camera, the smart phone, the drone, or the like, and control the digital camera, the smart phone, the drone, or the like. It is further possible to obtain photograph data and additional information stored in a so-called cloud constituted of a data center or a server group provided on the Internet through the transmitting and receiving antenna 101A and the radio communicating circuit 101.

Incidentally, when photograph data and additional information are obtained from an external apparatus such as the digital camera, the smart phone, the drone, or the like, the additional information does not include the pen ID necessary for association with the electronic pen 2. Therefore, when photograph data and additional information are obtained from the external apparatus such as the digital camera, the smart phone, the drone, or the like, the pen ID of the electronic pen 2 can be added to the additional information afterward.

In addition, instead of adding the pen ID, the pen ID and a user ID are associated with each other and stored in the memory 103 of the information processing device 100, and similarly an apparatus ID of the external apparatus such as the digital camera, the smart phone, the drone, or the like and the user ID are associated with each other and stored in the memory 103 of the information processing device 100. Then, when the user ID identified by the pen ID from the electronic pen 2 and the user ID identified by the apparatus ID from the external apparatus are the same, the electronic pen 2 and the photograph data to which the apparatus ID is added may be associated with each other. As the user ID, various kinds of user IDs that can identify the user can be used, such, for example, as a user name, a numerical string, or a combination of alphanumeric characters or the like.

In addition, the external apparatus such as the digital camera, the smart phone, the drone, or the like includes a clock circuit providing a present date and time and a GPS measuring a present position. Therefore, a clock circuit and a GPS are also included in the electronic pen 2 so that a present time and a present position can be provided from the electronic pen 2 to the information processing device 100 through the input device 300.

Then, the electronic pen 2 and the photograph data from the external apparatus may be associated with each other when the present time and the present position from the electronic pen 2 and the present time and the present position added to the photograph data from the external apparatus such as the digital camera, the smart phone, the drone, or the like are within certain ranges and therefore it can be determined that the electronic pen 2 and the external apparatus are used in a same area in a same time period.

In addition, the electronic pen 2 and the photograph data may be associated with each other using only one of the present time and the present position, instead of using both the present time and the present position. Thus, the electronic pen 2 and the photograph data can be associated with each other by using various kinds of information such as the pen ID, the apparatus ID, the present time, the present position, and the like. In addition, information associated with same information, such as the pen ID and the apparatus ID as described above, rather than directly associating information, may be used as associating information.

In addition, in the first embodiment described above, a description has been made supposing that the tablet type information terminal 1 and the electronic pen 2 are connected to each other by cable. However, there is no limitation to this. The tablet type information terminal 1 and the electronic pen 2 may of course be connected to each other by radio. For example, the tablet type information terminal 1 and the electronic pen 2 can be connected to each other by radio through various short-range radio communications referred to as wireless LAN connection in accordance with the Wi-Fi (registered trademark) standard, radio communication in accordance with the Bluetooth (registered trademark) standard, NFC (Near field radio communication), and the like as well as radio systems provided by improving or developing these radio communications.

In addition, in the first embodiment described above, after selecting the inspection target area, the information processing device 100 changes the device to the photograph association mode, and regards an indicating operation by the electronic pen 2 other than operations of operating buttons as an operation of indicating the association position of the photograph corresponding to the photograph data. However, there is no limitation to this.

For example, a change may be made to the photograph association mode when the shutter button is operated. In addition, an inclination of the electronic pen 2 with respect to the sensor 320 may be enabled to be detected, and a change may be made to the photograph association mode when the inclination of the electronic pen 2 is a predetermined angle or more or a predetermined angle or less. In addition, a change may be made to the photograph association mode when the electronic pen 2 and the photograph data can be associated with each other, or a change may be made to the photograph association mode when a predetermined side switch is depressed, as described with reference to FIG. 20B. In addition, a change may be made to the photograph association mode when a pen pressure applied to the electronic pen 2 is a predetermined value or more or a predetermined value or less.

Thus, in order to enable the information processing device 100 to recognize whether an indication of a position on the sensor 320 by the electronic pen 2 is an indication of the association position of the photograph corresponding to the photograph data or another indication, it suffices to change to the photograph association mode when a predetermined event occurs. Of course, when the side switch is used, it suffices to determine that an operation of indicating the association position of the photograph corresponding to the photograph data only when the side switch is used, rather than changing to the photograph association mode.

In addition, in the first embodiment described above, a description has been made of a case where various design drawings of inspection target areas are displayed on the display screen 220, and photograph data is associated with the design drawings. However, there is no limitation to this. For example, an overall photograph of a subject can be associated with a photograph of each part of the subject, or a photograph can be associated with a handwriting image captured as electronic data. That is, not only design drawings but also various images can be used as images to be associated with photographs.

In addition, in the first embodiment described above, a description has been made of a case where a target design drawing of an inspection target area is displayed on the display screen 220, and photograph data of an inspection target part is associated with the design drawing. However, in a case where an inspection target is a complex place such as a chemical plant or the like, it may not be possible to immediately identify an inspection point (inspection part) to be photographed. When a user (person in charge) unaccustomed to inspection, in particular, performs inspection, it may take time to identify the inspection point.

Accordingly, image data of the inspection part is obtained by photographing an image of the part in advance, and the image data is stored and retained in association with an area design drawing or the like of the inspection target area. Then, an inspection part search function is used when the user cannot immediately identify the inspection part after arriving at the target inspection area and selecting the design drawing to be used for inspection. The inspection part search function of the tablet type information terminal 1 includes the following three steps (1) to (3).

(1) An image of the inspection area is captured by imaging through the camera 22 of the electronic pen 2. (2) Image matching is performed between the captured camera image and an image (inspection part image) based on image data of the inspection part associated with the selected design drawing or the like. (3) A part (area) matching the inspection part image as a result of the image matching is identified as the inspection part, and the inspection part is notified to the user. The inspection part search function will be described concretely in the following.

Figure 23A:
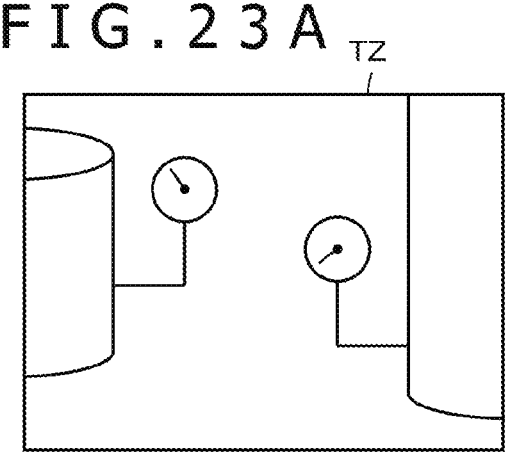
FIGS. 23A and 23B are diagrams of assistance in explaining an inspection part search function of the tablet type information terminal according to the embodiment.
Figure 23B:
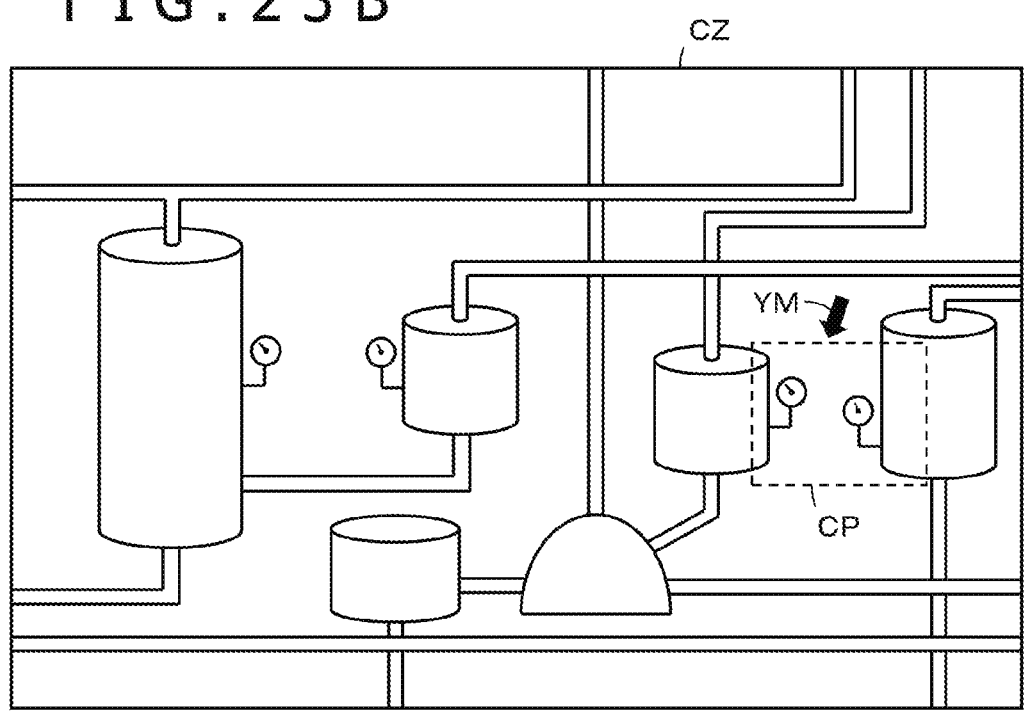

FIGS. 23A and 23B are diagrams of assistance in explaining the inspection part search function of the tablet type information terminal 1. FIG. 23A is a diagram depicting an inspection part image TZ formed by image data of the inspection part which image data is photographed in advance, and stored and retained. As also described above, suppose that the image data of the inspection part is stored and retained in the drawing etc. DB 105 in association with the area design drawing or the like.

Then, suppose that the inspection part search function is performed when the user arriving at the inspection target area, for example, selects an item corresponding to the inspection part search function from a menu displayed on the display screen 220 of the tablet type information terminal 1. In this case, the controller 102 of the tablet type information terminal 1 supplies a control signal to the electronic pen 2 to start the camera 22 of the electronic pen 2.

Further, the controller 102 instructs the user to photograph the inspection area by a voice message or a display message. In response to this, the user performs photographing with an imaging lens of the camera 22 of the electronic pen 2 directed toward the inspection area. Thus, the inspection area is imaged through the camera 22, and a camera image (imaged image) is transmitted to the tablet type information terminal 1 and displayed on the display screen 220 of the display 200.

FIG. 23B is a diagram depicting an example of a camera image CZ displayed on the display screen 220 of the tablet type information terminal 1. The controller 102 of the tablet type information terminal 1 performs processing of identifying the inspection part in the camera image CZ by performing pattern matching between the camera image CZ (FIG. 23B) and the inspection part image TZ (FIG. 23A). In short, the controller 102 identifies the contour of each object in the camera image CZ, and detects a part having a high degree of similarity to the contour of objects in the inspection part image TZ.

In the example of the camera image CZ depicted in FIG. 23B, a part having a high degree of similarity to the inspection part image TZ is detected on the right side of the camera image CZ. A dotted line is displayed so as to enclose the part, and an arrow YM is also displayed. An inspection part CP is thus notified to the user. Thus, the inspection part search function is a function using the inspection part image TZ as a marker, and notifying a part matching the marker as an inspection part. In other words, the inspection part search function implements a function as a so-called AR (Augmented Reality) marker. Thus, even when a user unaccustomed to inspection performs inspection, the user can quickly identify the inspection part without a mistake, and perform inspection properly. In addition, in a situation of actual inspection, when a problem part such, for example, as a crack, a discolored part, or the like is found, the dimensions of the problem part are desired to be grasped properly. Of course, information about the dimensions of the problem part or the like can be left in the above-described handwritten note that can be added to the image data of a photograph obtained by taking the problem part. However, it is more convenient to be able to grasp the dimensions of the problem part or the like at a glance from the image of the photograph obtained by taking the problem part.

However, even when the problem part is simply photographed, the size of the problem part or the like, specifically the length of the crack or the size of the discolored part cannot be grasped accurately from the photographed image. Because a state at a time of the photographing, such as a distance from the camera 22 to the subject (the problem part or the like) at the time of the photographing or the like, is not known, the actual size of the problem part or the like cannot be grasped from the photographed image. Accordingly, a device constituted of the tablet type information terminal 1 and the electronic pen 2 according to the present embodiment automatically adds a scale to the image itself of the imaged photograph, or makes it possible to measure the dimensions by actually applying a ruler and add a handwritten note onto the imaged image.

Figure 24A:
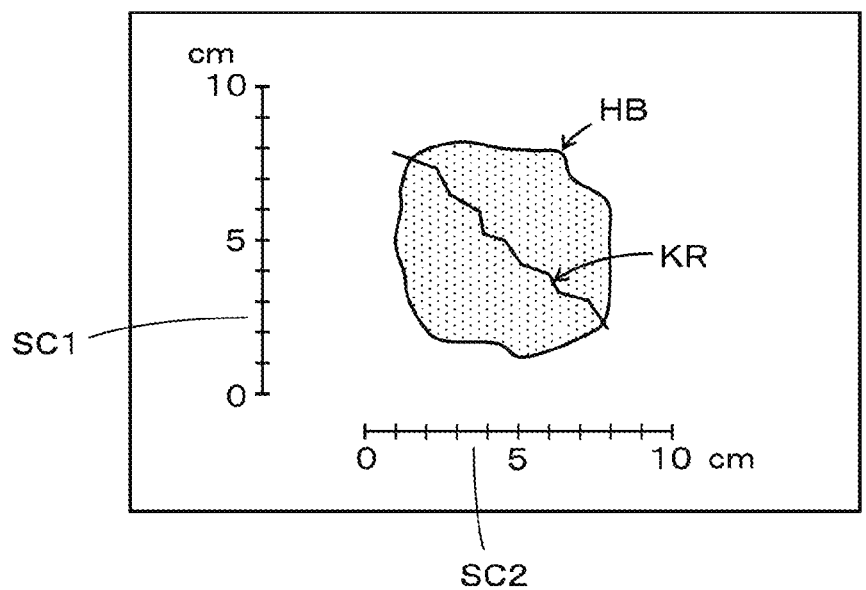
FIGS. 24A and 24B are diagrams of assistance in explaining a photographed image to which a scale is automatically added and a photographed image in which the size of a subject is grasped by applying a ruler to the target subject and a handwritten note is entered.
Figure 24B:
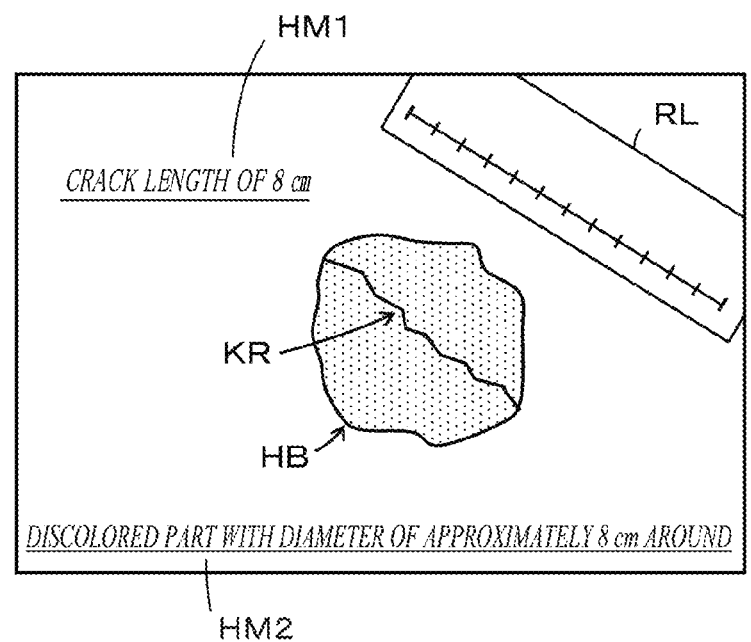

FIGS. 24A and 24B are diagrams of assistance in explaining a photographed image (FIG. 24A) to which a scale is automatically added and a photographed image (FIG. 24B) in which the size of a subject is grasped by applying a ruler to the target subject and a handwritten note is entered. A case of obtaining a photographed image to which a scale is automatically added will first be described with reference to FIG. 24A. Consideration will be given to a case of photographing a crack KR occurring in, for example, a wall surface of the inspection part and a discolored part HB occurring around the crack KR, as depicted in FIG. 24A.

In this case, when performing photographing through the camera 22 of the electronic pen 2, the user of the tablet type information terminal 1 performs a predetermined operation for adding a scale to a photographed image by, for example, indicating a scale adding button displayed on the display screen 220 or the like. In this case, the viewfinder control circuit 110 functions to recognize a subject present in the image captured through the camera 22, and synthesize a scale corresponding to the size of the subject in the image.

There are various methods for calculating the size of the subject. An example of the methods will be described. In short, when a focal length f of the camera 22, the number W of horizontal pixels of the photographed image, the number N of pixels occupied in a horizontal direction by the subject in the photographed image, and a distance R to the subject are known, a size L (mm) in the horizontal direction of the subject can be obtained by "(36R/f)(N/W)." In this case, the format of an imaging element size is assumed to correspond to a 35-mm film size (36 mm in the horizontal direction×24 mm in a vertical direction).

Hence, in the above-described equation, the length (size) in the horizontal direction of the subject is determined by obtaining a magnification in the horizontal direction by (36R/f) and multiplying the magnification in the horizontal direction by (N/W), which is a ratio of the subject in the horizontal direction to the whole of the photograph. Incidentally, a length (size) in a vertical direction of the object can be calculated similarly by using a constant "24" in place of the constant "36," and using the number of vertical pixels of the photographed image and the number of pixels occupied in the vertical direction by the subject in the photographed image. In addition, when the format of the imaging element size changes, the value of the constant part of the calculation equation changes accordingly.

In this case, the focal length f is information known in advance, and the number W of horizontal pixels and the number N of occupied pixels are information that can be grasped on the tablet type information terminal 1 side on the basis of the photographed image. However, the distance R from the camera 22 to the subject is usually not known. Therefore, the distance R to the subject is input to the tablet type information terminal 1 by the user at the time of photographing, or the distance R to the subject is calculated on the tablet type information terminal 1 side.

There are also various methods for calculating the distance R to the subject. An example of the methods will be described. In a usage mode of the present embodiment, an inspection part is photographed from a short distance of less than 1 m in many cases. Therefore, creation of a correspondence table between obtainable information such as the focal length and an amount of control at a time of focus adjustment or the like and the distance to the subject does not involve a very large amount of data. It is accordingly possible to prepare a correspondence table between obtainable information such as the focal length and an amount of control at a time of focus adjustment or the like and the distance to the subject, and obtain the distance to the subject on the basis of the correspondence table.

In addition, the tablet type information terminal 1 and the electronic pen 2 can measure the distance to the subject by including a so-called depth sensor. The distance to the subject can also be measured in a case where the camera 22 has a configuration of a 3D camera to be described later. In such a case, the distance to the subject which distance is measured by the depth sensor or the 3D camera can be used.

When the size of the subject, or the size of the crack KR and the discolored part HB in the present example is thus known, the viewfinder control circuit 110 superimposes a scale matching the size of the subject on the image captured through the camera 22. Thus, the image of the subject to which image the scale is automatically added can be photographed in a mode depicted in FIG. 24A. A vertical scale SC1 of 10 cm which scale is incremented in units of centimeters and a horizontal scale SC2 of 10 cm which scale is incremented in units of centimeters are displayed in the example depicted in FIG. 24A. It is thus possible to grasp clearly at a glance of the image that a crack having a length of approximately 8 cm occurs and that a circular discolored part having a diameter of approximately 8 cm is present around the crack.

Incidentally, when the crack and the discolored part are inconspicuous, the crack is traced and the periphery of the discolored part is traced by the electronic pen 2. The tablet type information terminal 1 grasps the position and shape of the subject as the crack and the discolored part on the image by identifying positions on the traced lines. The number N of pixels occupied in the horizontal direction by the subject and the number of pixels occupied in the vertical direction by the subject can be grasped on the basis of the grasped position and shape of the subject, and used for the above-described calculation.

Next, referring to FIG. 24B, description will be made of a case of obtaining a photographed image in which the size of a subject is grasped by applying a ruler to the target subject and a handwritten note is entered. Also in FIG. 24B, as in the case described with reference to FIG. 24A, consideration will be given to a case of photographing a crack KR occurring in, for example, a wall surface of the inspection part and a discolored part HB around the crack KR.

In the present example, as depicted in FIG. 24B, the size of the crack KR and the discolored part HB is actually measured by actually applying a ruler RL along the crack KR. Then, the part is imaged, the imaged image is displayed on the display screen 220 of the tablet type information terminal 1, and handwritten notes are input onto the imaged image by using the electronic pen 2. FIG. 24B depicts a state in which a handwritten note HM1 "crack length of 8 cm" is input and a handwritten note HM2 "discolored part with a diameter of approximately 8 cm around the crack" is input.

In the present example, the handwritten notes HM1 and HM2 and the imaged image of the inspection part may be stored and retained as integral image data such that the handwritten notes HM1 and HM2 are superimposed on the imaged image of the inspection part. In addition, separately from the imaged image, the handwritten notes HM1 and HM2 may be stored and retained together with coordinate data indicating a superimposing position on the imaged image. In the latter case, the handwritten notes HM1 and HM2 are superimposed and displayed on the imaged image at a time of reproduction of the imaged image.

Thus, the location of the problem of the crack and the discolored part or the like present in the inspection part can be clearly indicated by the handwritten notes of the user (inspector) together with the image of the inspection part. In addition, the size of the problem part such as the crack and the discolored part or the like and other important information can also be grasped clearly by the handwritten notes of the user.

Incidentally, the image of the problem part may of course be photographed with the ruler RL applied to the problem part. In addition, the contents of the handwritten notes are not limited to the size of the problem part, but various kinds of necessary information such as a method for treatment in the future, the presence or absence of urgency, and the like can be added by handwriting.

In addition, in the case where the photographed image and the handwritten notes are stored and retained separately from each other, the pen ID of the electronic pen 2 used when the handwritten note data is input is also added to the handwritten note data. Then, because the pen ID of the electronic pen 2 is also added to the photographed image as described above, the photographed image and the handwritten note data to be superimposed on the photographed image can be associated with each other easily. In addition, as in the case of the photographed image, the user having access to the handwriting image data can also be limited by individual information such as the pen ID, the user ID, or the like.

Second Embodiment

In the foregoing first embodiment, image data (photograph) obtained through the camera 22 of the electronic pen 2 and having the pen ID added thereto is associated with an indicated position in two-dimensional image data (area design drawing). That is, the associated pieces of image data are each two-dimensional image data. However, there is no limitation to this. Three-dimensional data can also be an object for association.

In this second embodiment, as a first example, 3D object data is prepared in advance, and two-dimensional image data obtained by photographing through the camera 22 of the electronic pen 2 is allowed to be associated with the 3D object data. The 3D object data is data for displaying a 3D object (three-dimensional object), and is three-dimensional data constituted of texture image data, polygon data, and the like.

In addition, in this second embodiment, as a second example, 3D (three-dimensional) space image data and 3D object data captured by photographing using a 3D (three-dimensional) camera are allowed to be associated with each other. The 3D space image data is, for example, data for displaying a three-dimensional space image of a state within a house or the like, and is three-dimensional data constituted of texture image data, polygon data, and the like as with the 3D object data.

Thus, the second embodiment to be described in the following is different from the first embodiment described above in that processing target data in the second embodiment is 3D object data and 3D space image data. However, the tablet type information terminal 1 according to the foregoing first embodiment can be used as an information processing device that processes the 3D object data and the 3D space image data. Therefore, suppose that the tablet type information terminal 1 and the electronic pen 2 according to the first embodiment described with reference to FIGS. 1 to 6 are used also in the second embodiment to be described in the following, and description will be made with reference also to drawings such as FIG. 1, FIG. 2, and the like as required.

First, a case where 3D object data prepared in advance and two-dimensional image data (photograph) are associated with each other will be described as a first example. First, 3D object data for displaying a target 3D object is generated by using 3D software of various kinds provided on the market, and the 3D object data is stored and retained in a predetermined storage area of the drawing etc. DB 105 of the tablet type information terminal 1.

Figures 25A, 25B:
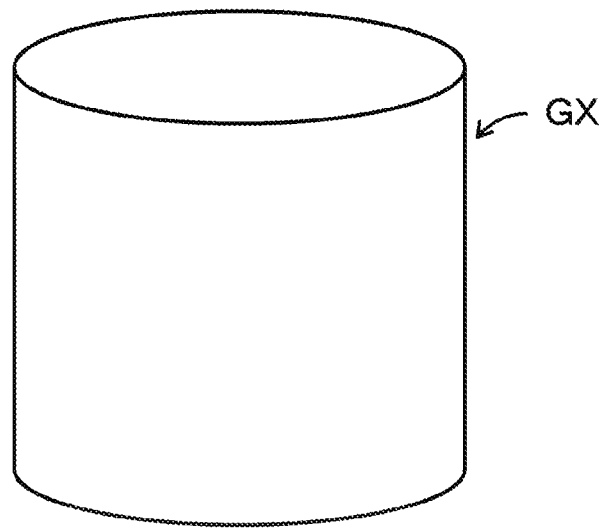
FIGS. 25A and 25B are diagrams of assistance in explaining an example of a three-dimensional (3D) object data file stored in a predetermined storage area of a drawing etc. DB in a second embodiment.

In this case, the generation of the 3D object data using the 3D software may be performed by the tablet type information terminal 1, or the generation of the 3D object data using the 3D software may be performed by another personal computer or the like and the generated 3D object data may be stored in the drawing etc. DB 105 of the tablet type information terminal 1. Incidentally, the 3D software includes a modeling function and a rendering function, and is able to generate a 3D object (three-dimensional model) and render (display) the 3D object (three-dimensional model). FIGS. 25A and 25B are diagrams of assistance in explaining an example of a 3D object data file stored in a predetermined storage area of the drawing etc. DB 105 in the second embodiment.

As depicted in FIG. 25A, the 3D object data file in the present example is obtained by adding metadata such as a stereoscopic image ID, a branch number, and remarks to 3D object data for displaying a 3D object. In the present example, the stereoscopic image ID is a five-digit number, and the branch number is a two-digit number. The 3D object data can be uniquely identified by the stereoscopic image ID and the branch number. The stereoscopic image ID corresponds to a typical 3D object (stereoscopic image) such, for example, as a circular cylinder, a prism, a circular cone, a pyramid, . . . . The branch number is information identifying a variation when the 3D object identified by the stereoscopic image ID has the variation.

That is, a circular cylinder has various variations in terms of the size of the area of a bottom surface or a top surface, the height of the circular cylinder, and the like. Therefore, a plurality of pieces of 3D object data for displaying 3D objects corresponding to the variations are stored in the drawing etc. DB 105, and one of the plurality of pieces of 3D object data can be identified by a stereoscopic image ID and a branch number. For example, a predetermined basic circular cylinder has a stereoscopic image ID "10001" and a branch number "01," and a circular cylinder having a top surface and a bottom surface smaller than those of the predetermined basic circular cylinder has the stereoscopic image ID "10001" and a branch number "02." Each of the pieces of 3D object data can be thus identified uniquely.

Incidentally, in the 3D object data file stored and retained in the drawing etc. DB 105, the name of the 3D object (stereoscopic image) displayed on the basis of the 3D object data identified by the stereoscopic image ID is also associated with the stereoscopic image ID. Further, various kinds of text information related to the object data can also be added as remarks.

The 3D object data file depicted in FIG. 25A indicates that the stereoscopic image ID of the 3D object data file is "10001," that the 3D object data stored in the 3D object data file is 3D object data for displaying a "circular cylinder," and that the branch number of the 3D object data is "01." In addition, text information "basic three-dimensional figure" is added as remarks. In the present example, as depicted in FIG. 25B, for example, a 3D object GX as a circular cylinder can be displayed on the basis of the 3D object data stored in the 3D object data file depicted in FIG. 25A.

Incidentally, as also described above, a plurality of pieces of 3D object data for displaying various 3D objects (solid figures) are formed in advance by using the 3D software. Then, necessary information such as a stereoscopic image ID, a branch number, and remarks are added to the formed 3D object data, and the 3D object data having the necessary information added thereto is stored and retained in a predetermined storage area of the drawing etc. DB 105 in the mode depicted in FIG. 25A. The 3D object data files thus stored and retained in the drawing etc. DB 105 can be used by the user of the tablet type information terminal 1.

Figure 26:
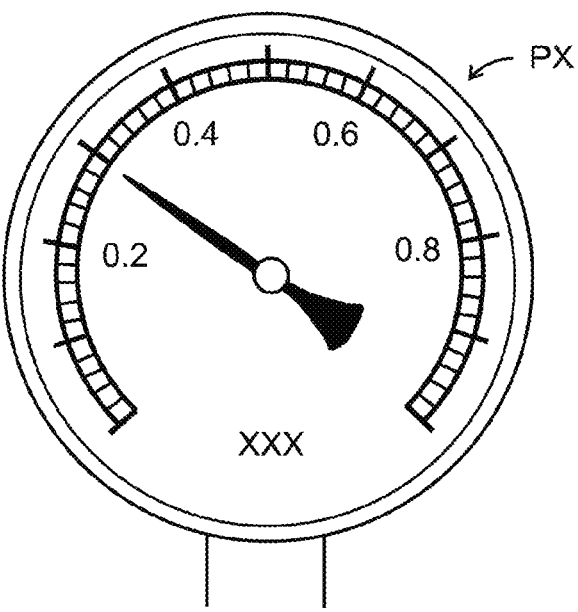
FIG. 26 is a diagram of assistance in explaining a concrete example of a photograph file stored in a photograph folder.

In addition, also in the present example, as described with reference to FIG. 4, the photograph folder 104 stores and retains photograph data (two-dimensional image data) obtained by photographing through the camera 22 of the electronic pen 2. FIG. 26 is a diagram of assistance in explaining a concrete example of a photograph file stored in the photograph folder 104. In the present example, as depicted in FIG. 26, suppose that the photograph folder 104 stores and retains photograph data for displaying a photograph PX of a pressure gage, for example, photographed in a certain inspection area.

Then, suppose that for a purpose of organizing a plurality of pieces of photograph data obtained by photographing, for example, though the purpose is not particularly limited, there occurs a case where each piece of photograph data is desired to be related to target 3D object data. In this case, the tablet type information terminal 1 in the present example can associate target photograph data with target 3D object data as in the first embodiment in which photograph data is associated with the design drawing data of an inspection area.

Figure 27:
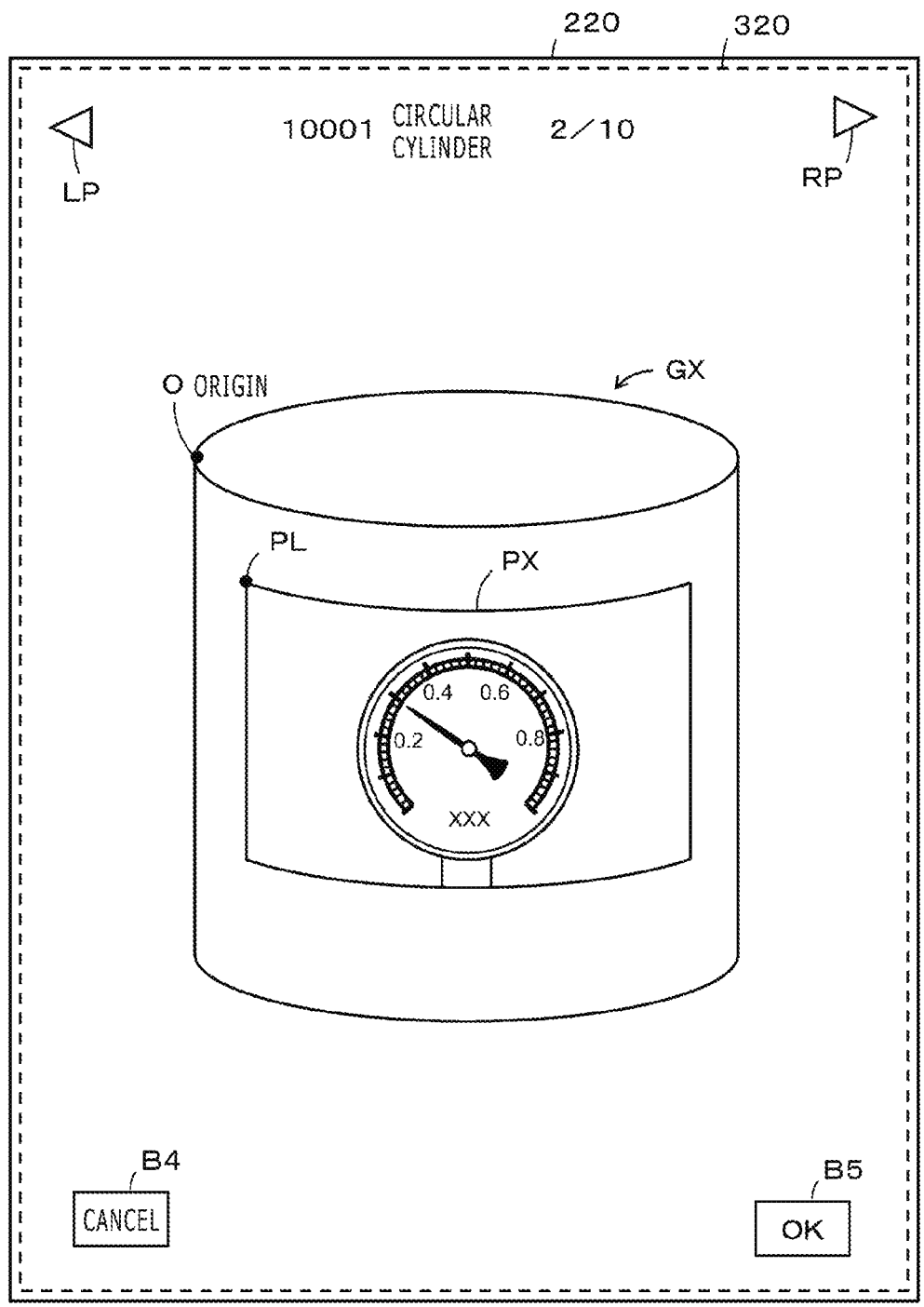
FIG. 27 is a diagram of assistance in explaining association of 3D object data and photograph data with each other.

FIG. 27 is a diagram of assistance in explaining association of 3D object data and photograph data with each other. The user of the tablet type information terminal 1 selects an item for associating 3D object data and photograph data with each other, the item being, for example, "texture mapping" or the like, from a menu displayed on the display screen 220 of the display 200. The controller 102 of the tablet type information terminal 1 thereby performs processing of associating the 3D object data and the photograph data with each other.

In this case, the controller 102 displays a list of typical 3D objects on the display screen 220 on the basis of 3D object data files in the drawing etc. DB 105 so as to allow selection by the user. The user selects a 3D object to be used for association from the list. Suppose in this case that a circular cylinder having the stereoscopic image ID "10001" is selected. Then, the controller 102 controls various circuits to perform processing of associating photograph data indicated by the user to the 3D object data selected by the user. In the present example, the drawing obtaining circuit 111 first functions to extract 3D object data files having the stereoscopic image ID "10001" from the drawing etc. DB 105. Next, the drawing display processing circuit 112 functions to display the 3D object corresponding to the 3D object data of the 3D object data file having the branch number "01" among the extracted 3D object data files having the stereoscopic image ID "10001" on the display screen 220.

As depicted in FIG. 27, for example, a display screen of the 3D object displays page change buttons LP and RP in an upper end portion of the display screen 220, and displays the stereoscopic image ID, the stereoscopic image (3D object) name, and a page number such as "1/10" or the like. Incidentally, the left page change button LP is not displayed on a first page of a corresponding 3D object, and the right page change button is not displayed on a last page. This is intended to prevent an invalid operation from being performed. Then, a page change is performed by indicating the page change button LP or RP by the electronic pen 2 so that a 3D object as an object for association can be selected. In addition, it is possible to grasp, on the basis of the page number, a total number of 3D object data files having the stereoscopic image ID and a present displayed page.

After the user then makes a target 3D object displayed on the display screen 220 by using the page change button LP or RP, the user next indicates, for example, an upper left end portion PL of a position for pasting a two-dimensional image corresponding to photograph data by the electronic pen 2. In this case, the controller 102 obtains coordinate data indicating the indicated position and the pen ID of the electronic pen 2 from the sensor 320 of the input device 330. The photograph obtaining circuit 106 then functions to read a photograph data file having the same pen ID as the pen ID obtained by the controller 102 as additional information from the photograph folder 104.

The first associating circuit 107 thereafter associates the coordinate data indicating the indicated position (coordinate data indicating the coordinate position on the sensor) and the photograph data with each other. The photograph associating circuit 108 next functions to display the photograph PX corresponding to the photograph data of the photograph file associated with the coordinate data indicating the coordinate position with the indicated coordinate position (upper left end portion PL) as a reference, as depicted in FIG. 27. The photograph display processing of the photograph display processing circuit 115 pastes and displays the photograph based on the extracted photograph data along a surface of the circular cylinder as the selected 3D object. A method of so-called texture mapping is used for the photograph display processing. Thus, as depicted in FIG. 27, the photograph PX of the pressure gage corresponding to the read photograph data is pasted so as to be along a surface (side surface in the present example) of the circular cylinder GX as the selected 3D object.

Then, the pasted position of the photograph PX can be moved on the 3D object GX when a drag operation is performed while the electronic pen 2 is in contact with the pasted photograph PX. Hence, it is also possible to paste the photograph PX from an upper surface of the 3D object GX to the side surface, for example. In addition, when a drag operation is performed while the electronic pen 2 is in contact with one of four sides of the pasted photograph PX, the side can be moved, and the width or height of the photograph PX can be changed. In addition, when a drag operation is performed while the electronic pen 2 is in contact with one of four vertices of the pasted photograph PX, the vertex can be moved, and the photograph PX can be deformed.

When the photograph is thus pasted to the 3D object, the second associating circuit 114 functions. The second associating circuit 114 generates associated data constituted of metadata related to the 3D object, the metadata including the stereoscopic image ID, the branch number, and remarks, and metadata related to the photograph, the metadata including the photograph ID and the coordinate data indicating the pasted position. Here, the pasted position of the photograph is the coordinate data indicating the position of each of finally determined four vertices of the photograph, and is converted into data indicating a position on the 3D object as a pasting target, rather than a position on the sensor 320.

The conversion in this case is performed into a position with an origin O in FIG. 27 as a reference when the 3D object is the circular cylinder, for example. The reference (origin O) is determined for each 3D object. Then, the second associating circuit 114 records the generated associated data in a predetermined storage area of the memory 103, for example, so that the associated data can be used repeatedly as required. The associated data in this case corresponds to the associated data in the first embodiment which associated data has been described with reference to FIG. 16.

Incidentally, in a case where there are a plurality of photograph data files obtained by photographing by the electronic pen 2 and having the electronic pen ID of the electronic pen 2 added thereto, thumbnail images of respective photographs based on the plurality of pieces of photograph data are first displayed, as in the first embodiment. Then, photograph data to be used for association is allowed to be selected from among the thumbnail images.

In addition, when the selected photograph data is the wrong photograph data, photograph data can be selected again by bringing the electronic pen 2 into contact with a button B4. In addition, when the target photograph can be pasted to the target position of the target 3D object, the association processing is ended by bringing the electronic pen 2 into contact with an OK button B5, associated data is generated as described above, and the generated associated data can be recorded in a predetermined storage area of the memory 103.

Thus, in the first example of the second embodiment, 3D object data and photograph data can be associated with each other by performing an operation of pasting the photograph to the 3D object. Moreover, because the pen ID of the electronic pen 2 is added to the photograph data, the photograph data obtained by imaging through the camera 22 of the electronic pen 2 can be automatically set as an object for association.

Description will next be made of a second example of the second embodiment, that is, a case of associating 3D space image data prepared in advance with 3D object data captured by photographing using a 3D camera. First, for example, 3D space image data for displaying a target 3D space image is generated by using 3D software, and the 3D space image data is stored and retained in a predetermined storage area of the drawing etc. DB 105 of the tablet type information terminal 1. The generation of the 3D space image data can be performed by the tablet type information terminal 1, or the generation of the 3D space image data may be performed by another personal computer or the like and the generated 3D space image data may be stored in the drawing etc. DB 105 of the tablet type information terminal 1.

Figures 28A, 28B:
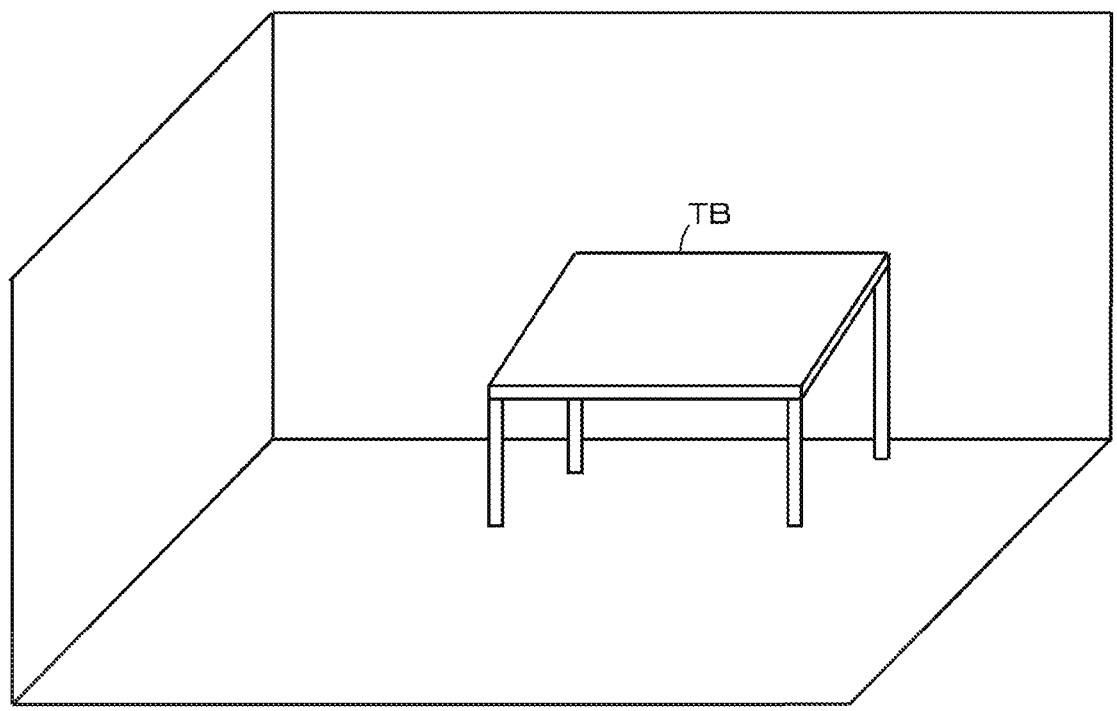
FIGS. 28A and 28B are diagrams of assistance in explaining an example of a 3D space image data file stored in the drawing etc. DB.

FIGS. 28A and 28B are diagrams of assistance in explaining an example of a 3D space image data file stored in the drawing etc. DB 105 in the present example. As depicted in FIG. 28A, the 3D space image data file in the present example is obtained by adding metadata such as a 3D space ID and remarks or the like to 3D space image data for displaying a 3D space image. In the present example, the 3D space ID is a five-digit number, and can uniquely identify the 3D space image data. In addition, the name of the 3D space image (stereoscopic image) displayed on the basis of the 3D space image data identified by the 3D space ID is also associated so as to correspond to the 3D space ID. Further, various kinds of text information related to the 3D space image data are stored as remarks.

The 3D space image data file depicted in FIG. 28A indicates that the 3D space ID of the 3D space image data file is "00001" and that the 3D space image data stored in the 3D space image data file is 3D space image data for displaying the 3D space image of "room interior A." In addition, text information "three-dimensional space image pattern of a room interior" is added as remarks. As depicted in FIG. 28B, for example, the three-dimensional space image of the room interior in which a table TB is placed can be displayed on the basis of the 3D space image data stored in the 3D space image data file depicted in FIG. 28A.

Incidentally, as also described above, a plurality of pieces of 3D space image data for displaying various 3D space images are formed in advance by using the 3D software. Then, necessary information such as a 3D space ID and remarks is added to the formed 3D space image data, and the 3D space image data having the necessary information added thereto is stored and retained in the drawing etc. DB 105 in the mode depicted in FIG. 28A. The 3D space image data files thus stored and retained in the drawing etc. DB 105 can be used by the user of the tablet type information terminal 1.

In the present example, an electronic pen 2C including a 3D camera 22C is connected to the tablet type information terminal 1. A distance from a 3D camera to a subject is known when a target subject (object) is photographed by using the 3D camera. Therefore, the tablet type information terminal 1 generates 3D object data for displaying the subject (object) as a 3D object on the basis of an image photographed through the 3D camera 22C of the electronic pen 2C, and stores and retains the 3D object data in the photograph folder 104.

Figure 29:
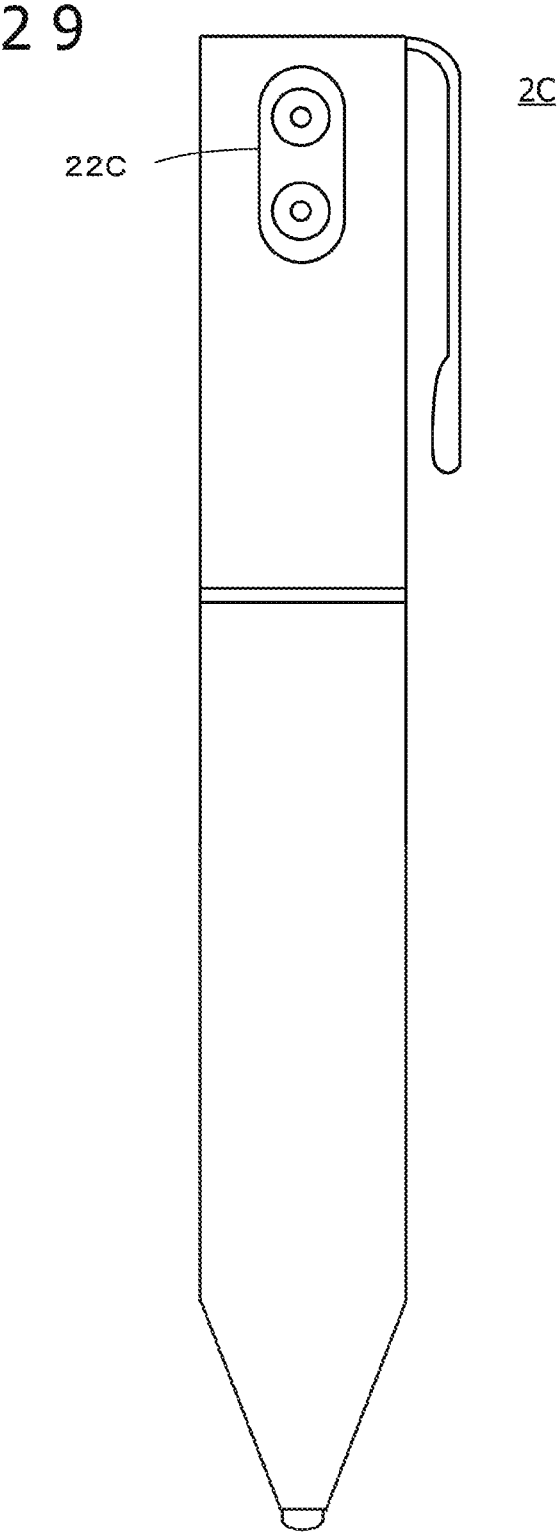
FIG. 29 is a diagram of assistance in explaining an external appearance of an electronic pen including a 3D camera.

FIG. 29 is a diagram of assistance in explaining an external appearance of the electronic pen 2C in the present example. As depicted in FIG. 29, the 3D camera 22C provided to the electronic pen 2C has two imaging lenses. Though not depicted, two imaging elements corresponding to the two imaging lenses, respectively, are provided, and a subject can be imaged through each of the two imaging lenses.

Hence, the 3D camera 22C can photograph images similar to those obtained by photographing images viewed by a left eye and a right eye, respectively, of a human. A distance between the two imaging lenses is known. A straight line connecting the two imaging lenses to each other is set as a base line. In addition, the angle of a corner formed between a straight line from each of both ends of the base line (centers of the imaging lenses) to a point of interest of a target subject and the base line is also known. Therefore, a distance to the point of interest of the subject is found by a triangulation method.

Utilizing this, the tablet type information terminal 1 can calculate distances to a plurality of points of interest of a subject from photograph data from the 3D camera 22C of the electronic pen 2C, and generate 3D object data of the subject (object) on the basis of the distances. Therefore, in the tablet type information terminal 1, for example the controller 102 functions to generate the 3D object data of the subject, and store and retain the 3D object data in the photograph folder 104, in addition to two pieces of photograph data imaged through the 3D camera 22C.

Figures 30A, 30B:
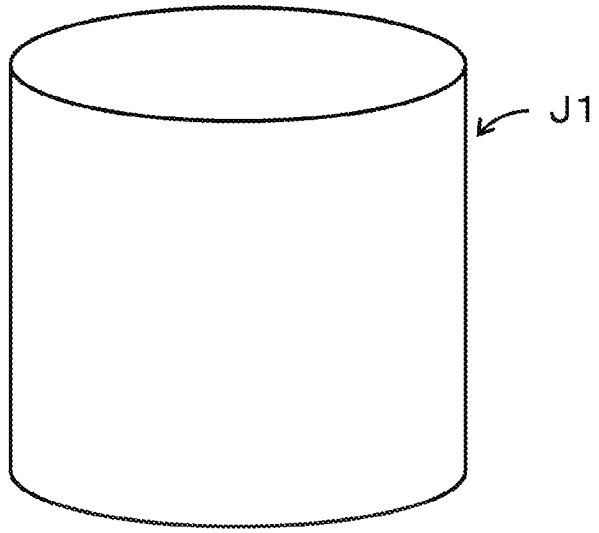
FIGS. 30A and 30B are diagrams of assistance in explaining a concrete example of a 3D object data file of a subject, the 3D object data file being stored in the photograph folder.

FIGS. 30A and 30B are diagrams of assistance in explaining a concrete example of a 3D object data file of a subject, the 3D object data file being stored in the photograph folder 104. As depicted in FIGS. 30A and 30B, the subject 3D object data file in the present example is formed by adding a subject ID and additional information to the 3D object data of the subject which 3D object data is generated on the basis of the photograph data obtained by photographing through the 3D camera 22C, as described above.

The subject ID can uniquely identify the subject 3D object data. The additional information is constituted of a photographing date and time, a photographing location, the pen ID, and other information, as in the case of the photograph data file described above. In addition, as in the case of the photograph data file described above, a handwritten note input through the tablet type information terminal 1 by the user using the electronic pen 2C as required can also be added to the subject 3D object data file.

On the basis of the subject 3D object data stored in the subject 3D object data file depicted in FIG. 30A, a 3D object of the photographed subject can be displayed as depicted in FIG. 30B, for example. FIG. 30B represents an image of the 3D object of, for example, a stool (seat) J1 having a cylindrical shape.

Suppose that there occurs a case where 3D space image data prepared in the drawing etc. DB 105 and subject 3D object data stored and retained in the photograph folder 104 are desired to be related to each other to check the layout of furniture in an assumed room interior, for example. In such a case, the tablet type information terminal 1 in the present example can associate the target subject 3D object data with the target 3D space image data, as in the case of associating photograph data with the drawing data of an inspection area.

FIG. 31 is a diagram of assistance in explaining the association of the 3D space image data and the subject 3D object data with each other. The user of the tablet type information terminal 1 selects an item for associating the 3D space image data and the subject 3D object data with each other, the item being, for example, "check layout within a 3D space" or the like, from a menu displayed on the display screen 220 of the display 200. Processing of associating the 3D space image data and the subject 3D object data with each other is thereby performed under control of the controller 102 of the tablet type information terminal 1.

In this case, the controller 102 forms a list of 3D space images on the basis of 3D space image data files stored and retained in the drawing etc. DB 105, and displays the list on the display screen 220. The user of the tablet type information terminal 1 selects a target 3D space image from the list displayed on the display screen 220. Here, suppose that the 3D space image data of "room interior A" having the 3D space ID "00001" is selected. Then, the controller 102 controls various circuits to perform the processing of associating the subject 3D object data with the 3D space image data.

First, the drawing obtaining circuit 111 functions to extract the 3D space image data file having the 3D space ID "00001" from the drawing etc. DB 105. Next, the drawing display processing circuit 112 functions to display, on the display screen 220, the 3D space image corresponding to the 3D space image data of the extracted 3D space image data file having the 3D space ID "00001." In this case, as depicted in FIG. 31, for example, an upper end portion of the display screen 220 displays page change buttons LP and RP, and displays the 3D space ID, the name of the 3D space image, and a page number such as "2/10" or the like. Incidentally, the left page change button LP is not displayed on a first page of a corresponding 3D space image, and the right page change button is not displayed on a last page. This is intended to prevent an invalid operation from being performed. In addition, it is possible to grasp, on the basis of the page number, a total number of 3D space image data files and a present displayed page.

Then, when the selected 3D space image is not the intended 3D space image, the user can perform a page change by using the page change button LP or RP, and display the intended 3D space image on the display screen 220. After the intended 3D space image is thus displayed on the display screen 220, a position Pt at which to display (dispose) the 3D object of the subject is next indicated by bringing the electronic pen 2C into contact with the display screen 220. In this case, the controller 102 obtains coordinate data indicating the indicated position and the pen ID of the electronic pen 2C from the sensor 320 of the input device 330. The photograph obtaining circuit 106 then functions to read the subject 3D object data file having the same pen ID as the pen ID obtained by the controller 102 as additional information from the photograph folder 104.

The first associating circuit 107 thereafter associates the coordinate data indicating the indicated coordinate position and the read subject 3D object data file with each other. The photograph associating circuit 108 next functions to display the 3D object J1 corresponding to the 3D object data of the subject 3D object data file associated with the coordinate data indicating the coordinate position, with the indicated coordinate position Pt as a reference. Thus, as depicted in FIG. 31, the 3D object (cylindrical stool in the present example) corresponding to the extracted subject 3D object data is disposed (pasted) at the indicated position within the selected 3D space image. When a drag operation is then performed while the electronic pen 2C is in contact with the disposed 3D object J1, the arrangement position of the 3D object (cylindrical stool) can be moved.

When the 3D object of the subject is thus disposed in the 3D space image, the second associating circuit 114 functions to generate associated data constituted of metadata related to the 3D space image, the metadata including the 3D space ID and remarks, and metadata related to the 3D object of the subject, the metadata including the subject ID and the coordinate data indicating the pasted position, and record the associated data in a predetermined storage area of the memory 103, for example, so that the associated data can be used repeatedly as required.

Here, the pasted position of the 3D object of the subject is coordinate data that can identify a finally determined pasted position of the 3D object of the subject, and is converted into data indicating a position on the 3D space image as a disposing target, rather than a position on the sensor 320. The conversion in this case is performed into a position with an origin O in FIG. 31 as a reference when the 3D space image is the 3D space image depicted in FIG. 31, for example. Then, the second associating circuit 114 records the generated associated data in a predetermined storage area of the memory 103, for example, so that the associated data can be used repeatedly as required. The associated data in this case corresponds to the associated data in the first embodiment which associated data has been described with reference to FIG. 16.

Incidentally, there may be a plurality of 3D object data files of 3D objects of the subject, the 3D objects being generated on the basis of image data obtained by photographing through the 3D camera 22C of the electronic pen 2C. In this case, as in the first embodiment, thumbnail images of the plurality of 3D objects of the subject are displayed first, and a subject 3D object to be used for association is allowed to be selected from among the thumbnail images.

In addition, as depicted in FIG. 31, by indicating another pasting position Pt2 by the electronic pen 2C after disposing the 3D object J1 of the subject, it is possible to add and dispose a 3D object (rectangular parallelepipedic stool in FIG. 31) J2 of another subject at the pasting position.

In addition, when the selected subject 3D object data is the wrong data, subject 3D object data can be selected again by bringing the electronic pen 2C into contact with a button B4. In addition, when the 3D object of the target subject can be disposed at the target position of the target 3D space image, the association processing is ended by bringing the electronic pen 2C into contact with an OK button B5. In this case, the controller 102 can record the associated data generated as described above in a predetermined storage area of the memory 103.

Further, the subject 3D object disposed within the 3D space image can be enlarged or reduced. In this case, information indicating a reduction/enlargement ratio of the subject 3D object is also added to the associated data generated by the second associating circuit 114. In addition, the subject 3D object can also be converted into an appropriate size automatically according to the size of the 3D space image in which the subject 3D object is disposed.

Thus, in the second example of the second embodiment, the 3D space image data and the subject 3D object data can be associated with each other by performing an operation of disposing the subject 3D object in the 3D space image. Moreover, because the pen ID of the electronic pen 2C is added to the subject 3D object data, the subject 3D object data obtained by imaging through the 3D camera 22C of the electronic pen 2C can be automatically set as an object for association.

Effects of Second Embodiment

According to the tablet type information terminal 1 and the electronic pen 2 in accordance with the first example of the second embodiment described above, photograph data associated with the electronic pen 2 can be obtained. Then, a photograph (image) corresponding to the obtained photograph data can be displayed so as to be pasted at a target position of a 3D object displayed on the display screen 220 on the basis of 3D object data. Of course, it is also possible to manage the photograph data as a pasting object and the indicated position on the displayed 3D object in association with each other.

According to the tablet type information terminal 1 and the electronic pen 2C in accordance with the second example of the second embodiment described above, subject 3D object data associated with the electronic pen 2C can be obtained. Then, a 3D object corresponding to the obtained 3D object data can be displayed so as to be pasted at a target position of a 3D space image displayed on the display screen 220 on the basis of 3D space image data. Of course, it is also possible to manage the subject 3D object data as a pasting object and the indicated position on the displayed 3D space image in association with each other.

Modifications of Second Embodiment and Others

It is to be noted that while a description has been made in the present example supposing that 3D space image data is generated in advance using the 3D software, there is no limitation to this. For example, in a case where there is a real space to be represented as a 3D space image, as in a case where there is actually a model home, for example, the real space may be photographed by using the 3D camera, and 3D space image data may be generated on the basis of photograph data obtained by the photographing. The generation of the 3D space image data may be performed by the controller 102, or a generating functioning under control of the controller 102 may be provided additionally.

In addition, also in the second embodiment, as in the first embodiment, in a case where the sensor 320 of the input device 300 is a capacitive type sensor, position indication can be performed by a finger of a user. In addition, position indication can also be performed by using an electronic pen that does not send out information indicating the pen ID.

In addition, also in the second embodiment, 3D object data as a photograph pasting target, 3D space image data, subject 3D object data to be associated with a 3D space image, and the like can be supplied externally. Additional information and metadata added to these pieces of data can also be provided together with these pieces of three-dimensional data. In this case, the provision can be made from an external apparatus preferentially connected to the tablet type information terminal 1, or the provision can be made via short-range radio communication. Of course, three-dimensional data and information accompanying the three-dimensional data can be provided from servers present on the Internet, that is, a so-called cloud.

In addition, in the second example of the second embodiment, as in the selection of an area design drawing in the first embodiment, when the user carrying the tablet type information terminal 1 arrives at a target location, the 3D space image data of the location is extracted. Then, a 3D space image corresponding to the extracted 3D space image data can be automatically displayed on the display screen.

In this case, as in the foregoing first embodiment, the reached location can be identified by using a beacon signal from a base station. Of course, as described in the foregoing first embodiment, whether or not the target location is reached can be determined by a method such, for example, as using infrared communication with an infrared communicating device installed in the target location or identifying the present position using the present position detected by a GPS function incorporated in the tablet type information terminal 1.

Others

Incidentally, in the foregoing embodiments, a description has been made by taking as an example a case where the present disclosure is applied to the tablet type information terminal 1 in which the information processing device 100, the display 200, and the input device 300 are integral with each other. However, there is no limitation to this. For example, the present disclosure can be applied to an image processing system that includes a personal computer main (corresponding to the information processing device), a monitor device (corresponding to the display), and a digitizer (corresponding to the input device) receiving indication input by the electronic pen, and in which system the personal computer main, the monitor device, and the digitizer are separate from each other.

In the case of the tablet type information terminal 1 according to the foregoing embodiments, the sensor 320 of the input device 300 is provided so as to correspond to the whole surface of the display screen 220 of the display 200. Therefore, an indicated position on the sensor 320 directly indicates the corresponding position on the display screen 220 of the display 200. However, in a case where the display screen 220 is disposed in a part of the sensor 320, it suffices, in the personal computer main, to convert an indicated position on the sensor area of the digitizer into an indicated position (coordinate data) on the display screen of the monitor device, and associate the coordinate data after the conversion with image data as an association object. Hence, it is also possible to associate an indicated position on the sensor area of the digitizer with image data as an association object, and supply the indicated position and the image data associated with each other to an information processing device such as a personal computer or the like, where the indicated position on the sensor area is converted into an indicated position on the display screen, and the indicated position on the display screen is used.

In addition, in the foregoing embodiments, photograph data imaged by the camera 22 or 22C of the electronic pen 2 or 2C or the like is transmitted to the tablet type information terminal 1 each time imaging is performed. However, there is no limitation to this. The electronic pen 2 or 2C is enabled to store and retain the photograph data of a plurality of photographs by incorporating a nonvolatile memory such as a flash memory for image storage or the like in the electronic pen 2 or 2C. Also in this case, additional information (second additional information) such as the electronic pen ID or the like is associated with each piece of photograph data.

Then, the plurality of pieces of photograph data stored in the nonvolatile memory of the electronic pen 2 or 2C can be transmitted to the tablet type information terminal 1 so that the plurality of pieces of photograph data can be used. In this case, the method described with reference to FIG. 13B can be used as a method for specifying target photograph data from among the plurality of pieces of photograph data.

In addition, in a case where the tablet type information terminal 1 includes an imaging (camera function), photograph data obtained by imaging through the imaging of the tablet type information terminal 1 can be used as an association object. In this case, additional information (second additional information) such as the pen ID or the like is added also to the photograph data obtained by imaging through the imaging of the tablet type information terminal 1. Thus, the photograph data obtained by imaging through the imaging of the tablet type information terminal 1 can be handled in a manner similar to photograph data obtained by imaging using the camera of the electronic pen 2, an external digital camera, a smart phone, or the like.

Incidentally, as is understood from the description of the foregoing embodiments, respective functions of a first obtaining section, a second obtaining section, and a first associating section of an image processing device described in claims (which image processing device will hereinafter be described simply as an image processing device) are implemented by the I/O 140, the photograph obtaining circuit 106, and the first associating circuit 107 of the information processing device 100 of the tablet type information terminal 1 according to the embodiments (which information processing device will hereinafter be described simply as an information processing device).

In addition, functions of additional information extracting section of the image processing device are implemented by the I/O port 140 or the reception antenna 150A and the reception circuit 150 of the information processing device 100. In addition, functions of associating section of the image processing device are implemented by the photograph associating circuit 108 of the information processing device 100, and functions of imaging control section of the image processing device are implemented by the imaging control circuit 109 of the information processing device 100.

In addition, functions of first display processing section of the image processing device are implemented by the viewfinder control circuit 110 of the information processing device 100, and functions of receiving section of the image processing device are implemented by the input device 300. In addition, functions of third obtaining section of the image processing device are implemented by the drawing obtaining circuit 111 of the information processing device 100, and functions of second display processing section of the image processing device are implemented by the drawing display processing circuit 112 of the information processing device 100.

In addition, functions of coordinate transforming section of the image processing device are implemented by the coordinate transforming circuit 113 of the information processing device 100, and functions of second associating section of the image processing device are implemented by the second associating circuit 114 of the information processing device 100. In addition, functions of short-range radio communicating section of the image processing device are implemented by the short-range radio communication antenna 120A and the short-range radio communication circuit 120 of the information processing device 100, and functions of third display processing section of the image processing device are implemented by the photograph display processing circuit 115 of the information processing device 100.

In addition, functions of edit processing section of the image processing device are implemented by the edit processing circuit 116 of the information processing device 100, and functions of mode changing section of the image processing device are implemented by the mode switching circuit 117 of the information processing device 100.

In addition, the method described with reference to the flowcharts of FIGS. 7 to 10 in the foregoing embodiments is a method to which one embodiment of an image processing method according to the present disclosure is applied. In addition, respective functions of the photograph obtaining circuit 106, the first associating circuit 107, the photograph associating circuit 108, the imaging control circuit 109, the viewfinder control circuit 110, the drawing obtaining circuit 111, the drawing display processing circuit 112, the coordinate transforming circuit 113, the second associating circuit 114, the photograph display processing circuit 115, the edit processing circuit 116, and the mode switching circuit 117 of the information processing device 100, which circuits are depicted in FIG. 2, can also be implemented as functions of the controller 102 by a program stored in the memory 103 that is executed in the controller 102.

It is to be noted that the embodiments of the present disclosure are not limited to the foregoing embodiment, and that various changes can be made without departing from the spirit of the present disclosure.

What is claimed is:

1. An image processing device comprising:
    a processor; and
    a memory coupled to the processor, the memory storing a program that, when executed by the processor, causes the image processing device to:
        obtain first coordinate data of a coordinate position indicated by a position indicator from a sensor that detects the coordinate position indicated by the position indicator;
        obtain an identifier of the position indicator from the position indicator;
        obtain first image data including the identifier of the position indicator obtained from the position indicator;
        associate the first coordinate data obtained from the sensor that detects the coordinate position indicated by the position indicator with the first image data including the identifier of the position indicator obtained from the position indicator; and
        control for displaying an image corresponding to the first image data including the identifier of the position indicator obtained from the position indicator, based on a position on a display screen of a display device corresponding to the first coordinate data of the coordinate position obtained from the sensor that detects the coordinate position indicated by the position indicator that is associated with the first image data including the identifier of the position indicator obtained from the position indicator.

2. The image processing device according to claim 1, wherein the program, when executed by the processor, causes the image processing device to obtain the first image data from a first imaging device external to the information processing device that imaged the first image data or a second imaging device arranged in the position indicator that imaged the first image data.

3. The image processing device according to claim 2, wherein the program, when executed by the processor, causes the image processing device to control the first imaging device or the second imaging device according to an input from a user.

4. The image processing device according to claim 2, wherein the program, when executed by the processor, causes the image processing device to:
be supplied with image data forming an image of a subject from the first imaging device or the second imaging device, and display the image corresponding to the image data on a predetermined display region of the display screen of the display device; and
control the first imaging device or the second imaging device according to an input from a user.

5. The image processing device according to claim 1, wherein the program, when executed by the processor, causes the image processing device to obtain the first image data via a network.

6. The image processing device according to claim 1, wherein the program, when executed by the processor, causes the image processing device to:
obtain first additional information notified by a signal transmitted from the position indicator; and
obtain the first image data associated with the position indicator when authentication is achieved based on the first additional information and second additional information as predetermined additional information added to the first image data.

7. The image processing device according to claim 6, wherein the program, when executed by the processor, causes the image processing device to obtain the first additional information from the sensor that receives the signal from the position indicator, detect the indicated coordinate position, and extract the first additional information included in the signal.

8. The image processing device according to claim 6, wherein the image processing device receives the signal transmitted from the position indicator in accordance with a wireless communication standard, and the program, when executed by the processor, causes the image processing device to obtain the first additional information from the received signal.

9. The image processing device according to claim 6, wherein the program, when executed by the processor, causes the image processing device to obtain the first image data from a first imaging device external to the information processing device that imaged the first image data or a second imaging device included in the position indicator that imaged the first image data, the second additional information being added to the first image data, the first additional information from the position indicator and the second additional information enabling the image corresponding to the first image data to be displayed at the position on the display screen of the display device.

10. The image processing device according to claim 6, wherein the first image data is retained on a network, and the program, when executed by the processor, causes the image processing device to obtain the first image data via the network, the second additional information added to the first image data, the first additional information from the position indicator and the second additional information enabling the image corresponding to the first image data to be displayed at the position on the display screen of the display device.

11. The image processing device according to claim 1, wherein the program, when executed by the processor, causes the image processing device to paste the image corresponding to the first image data at the position on the display screen of the display device.

12. The image processing device according to claim 1, wherein the program, when executed by the processor, causes the image processing device to:
receive an input from a user;
obtain second image data forming a main image to be displayed on the display screen of the display device according to the input from the user;
display the main image corresponding to the second image data on the display screen of the display device;
transform the position on the display screen of the display device, the position corresponding to the coordinate data, into second coordinate data indicating a position on the main image displayed on the display screen; and
associate the second image data forming the main image displayed on the display screen, the second coordinate data, and the first image data with one another.

13. The image processing device according to claim 1, further comprising:
a radio communication circuit which, in operation, receives a signal from a base station in accordance with a wireless communication standard, wherein the program, when executed by the processor, causes the image processing device to:
obtain second image data forming a main image to be displayed on the display screen of the display device based on information received through the radio communication circuit;
display the main image corresponding to the second image data on the display screen of the display device;
transform the position on the display screen of the display device, the position corresponding to the coordinate data, into second coordinate data indicating a position on the main image displayed on the display screen; and
associate the second image data forming the main image displayed on the display screen, the second coordinate data, and the first image data with one another.

14. The image processing device according to claim 1, wherein the program, when executed by the processor, causes the image processing device to:
reduce or enlarge the image displayed on the display screen of the display device according to a distance from the position indicator to the sensor that is detected through the sensor.

15. The image processing device according to claim 1, wherein the program, when executed by the processor, causes the image processing device to:
receive an input from a user; and change to an association mode in which the first coordinate data is used as an association position of the image corresponding to the first image data, when the input from the user is received.

16. The image processing device according to claim 1, wherein the display device and the sensor are superposed on each other.

17. An image processing method comprising:
obtaining first coordinate data indicating a coordinate position indicated by a position indicator from a sensor that detects the coordinate position indicated by the position indicator;
obtaining an identifier of the position indicator from the position indicator;
obtaining first image data including the identifier of the position indicator obtained from the position indicator;
associate the first coordinate data obtained from the sensor that detects the coordinate position indicated by the position indicator with the first image data including the identifier of the position indicator obtained from the position indicator; and
controlling for displaying an image corresponding to the first image data including the identifier of the position indicator obtained from the position indicator, based on a position on a display screen of a display device corresponding to the first coordinate data of the coordinate position obtained from the sensor that detects the coordinate position indicated by the position indicator that is associated with the first image data including the identifier of the position indicator obtained from the position indicator.

18. The image processing method according to claim 17, further comprising:
obtaining first additional information notified by a signal transmitted from the position indicator;
wherein the obtaining of the first image data includes obtaining the first image data associated with the position indicator when authentication is achieved based on the first additional information and second additional information as predetermined additional information added to the first image data.

19. The image processing method according to claim 17, further comprising:
receiving an indication input from a user;
identifying second image data forming a main image to be displayed on the display screen of the display device according to the indication input;
displaying the main image corresponding to the second image data on the display screen of the display device;
transforming the position on the display screen of the display device, the position corresponding to the first coordinate data, into second coordinate data indicating a position on the main image displayed on the display screen; and
associating the second image data forming the main image displayed on the display screen, the second coordinate data, and the first image data with one another.

20. The image processing method according to claim 17, further comprising:
wirelessly receiving a signal from a base station in accordance with a wireless communication standard;
identifying second image data forming a main image to be displayed on the display screen of the display device based on the signal;
displaying the main image corresponding to the second image data on the display screen of the display device;
transforming the position on the display screen of the display device, the position corresponding to the first coordinate data, into second coordinate data indicating a position on the main image displayed on the display screen; and
associating the second image data forming the main image displayed on the display screen, the second coordinate data, and the first image data with one another.

* * * * *